United States Patent
Wang et al.

(10) Patent No.: US 10,805,132 B2
(45) Date of Patent: Oct. 13, 2020

(54) DATA PROCESSING METHOD AND APPARATUS

(71) Applicant: HUAWEI TECHNOLOGIES CO., LTD., Shenzhen (CN)

(72) Inventors: Zongjie Wang, Shenzhen (CN); Jinlin Peng, Shanghai (CN); Mengying Ding, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 54 days.

(21) Appl. No.: 16/179,887

(22) Filed: Nov. 3, 2018

(65) Prior Publication Data
US 2019/0075003 A1 Mar. 7, 2019

Related U.S. Application Data

(63) Continuation of application No. PCT/CN2016/080969, filed on May 4, 2016.

(51) Int. Cl.
| | | |
|---|---|---|
| *H04L 27/26* | (2006.01) | |
| *H04L 5/00* | (2006.01) | |
| *H04L 5/14* | (2006.01) | |

(52) U.S. Cl.
CPC ........ *H04L 27/2607* (2013.01); *H04L 5/0048* (2013.01); *H04L 5/1469* (2013.01); *H04L 27/26* (2013.01); *H04L 27/2602* (2013.01); *H04L 27/2628* (2013.01)

(58) Field of Classification Search
None
See application file for complete search history.

(56) References Cited

U.S. PATENT DOCUMENTS

| | | | |
|---|---|---|---|
| 2008/0181249 A1* | 7/2008 | Karaoguz | H04L 69/18 370/419 |
| 2010/0061474 A1 | 3/2010 | Razzell | |
| 2015/0326408 A1 | 11/2015 | Vermani et al. | |
| 2016/0072654 A1* | 3/2016 | Choi | H04L 27/2666 370/329 |
| 2016/0119452 A1 | 4/2016 | Lee et al. | |

FOREIGN PATENT DOCUMENTS

| | | |
|---|---|---|
| CN | 101675637 A | 3/2010 |
| CN | 101778063 A | 7/2010 |
| CN | 105229951 A | 1/2016 |

* cited by examiner

*Primary Examiner* — Diane L Lo
(74) *Attorney, Agent, or Firm* — Kilpatrick Townsend & Stockton LLP

(57) ABSTRACT

Embodiments of the present disclosure provide a data processing method and apparatus. The method includes: pre-processing, by a transmit end, data transmitted on at least two first-type symbols in a radio frame that are parallel, and converting the data transmitted on the at least two parallel first-type symbols into data transmitted on a shared symbol; adding, by the transmit end, a first CP to the data transmitted on the shared symbol; and sending, to a receive end, the data that is transmitted on the shared symbol and to which the first CP is added.

18 Claims, 15 Drawing Sheets

DATA PROCESSING METHOD AND APPARATUS

CROSS-REFERENCE TO RELATED APPLICATIONS

This application is a continuation of International Application No. PCT/CN2016/080969, filed on May 4, 2016, the disclosure of which is hereby incorporated by reference in its entirety.

TECHNICAL FIELD

Embodiments of the present disclosure relate to communications technologies, and in particular, to a data processing method and apparatus.

BACKGROUND

Delay spread means that when data is transmitted in a wireless communications system, a channel delay is generated when the data arrives at a receive end through different propagation paths. Consequently, intersymbol interference (ISI) occurs on the transmitted data, and data transmission quality is affected.

To avoid using a complex balanced processing manner to eliminate the ISI, a cyclic prefix (Cyclic Prefix) is introduced to a radio frame in a Long Term Evolution (Long Term Evolution) system. To be specific, a CP is added to each symbol constituting the radio frame, to resist channel delay spread. With development of communications technologies, a subcarrier spacing needs to be increased to implement low-delay and high-reliability communication or communication in a high-speed movement scenario. When the subcarrier spacing is increased, a time length of each symbol in the radio frame is proportionally shortened. To ensure unchanged CP overheads, duration of the CP added to each symbol is currently proportionally shortened based on the proportion of shortening the time length of each symbol.

However, if such a data processing manner in which the duration of the CP is proportionally shortened is used, because the duration of the CP is shortened, delay spread that may be resisted in a data transmission process is also proportionally reduced. Consequently, a data transmission coverage area is reduced.

SUMMARY

Embodiments of the present disclosure provide a data processing method and apparatus, so as to resolve a prior-art problem that a data transmission coverage area is reduced because delay spread that may be resisted in a data transmission process is reduced when a subcarrier spacing is increased.

According to a first aspect, an embodiment of the present disclosure provides a data processing method, including:

preprocessing, by a transmit end, data transmitted on at least two first-type symbols in a radio frame that are serial in time domain, and converting the data transmitted on the at least two first-type symbols into data transmitted on a shared symbol, where the data transmitted on the shared symbol includes the data transmitted on the at least two first-type symbols;

performing, by the transmit end, inverse fast Fourier transform IFFT processing on the data transmitted on the shared symbol;

adding, by the transmit end, a first cyclic prefix CP to the data that is transmitted on the shared symbol and on which IFFT processing is performed; and sending, by the transmit end to a receive end, the data that is transmitted on the shared symbol and to which the first CP is added.

Based on the foregoing embodiment, the radio frame further includes one or more second-type symbols, and a time length of the second-type symbol is less than a time length of the shared symbol; and the method further includes:

adding, by the transmit end, a second CP to data transmitted on the second-type symbol; and the sending, by the transmit end to a receive end, the data that is transmitted on the shared symbol and to which the first CP is added includes:

sending, by the transmit end to the receive end, the data that is transmitted on the one or more second-type symbols and to which the second CP is added and the data that is transmitted on the shared symbol and to which the first CP is added.

Based on the foregoing embodiment, the preprocessing, by a transmit end, data transmitted on first-type symbols in a radio frame that are serial in time domain includes:

preprocessing, by the transmit end by using interleaving Fourier transform, serial-to-parallel conversion, overall Fourier transform, a Hadamard matrix, or an identity matrix, data transmitted on at least two first-type symbols in the radio frame that are parallel.

Based on the foregoing embodiment, the first-type symbol is used to transmit uplink data or downlink data, and the second-type symbol is used to transmit a reference signal or used to control information about uplink data transmission or downlink data transmission, or is used as a guard interval for uplink-downlink transition in a time division duplex TDD mode.

Based on the foregoing embodiment, the data transmitted on the first-type symbol is uplink data, and before the preprocessing, by a transmit end, data transmitted on at least two first-type symbols in a radio frame that are serial in time domain, the method further includes:

performing, by the transmit end, discrete Fourier transform on at least two pieces of input data, to obtain the data transmitted on the first-type symbol.

Based on the foregoing embodiment, the data transmitted on the first-type symbol is downlink data, and before the preprocessing, by a transmit end, data transmitted on at least two first-type symbols in a radio frame that are serial in time domain, the method further includes:

performing, by the transmit end, serial-to-parallel conversion on at least two pieces of input data, to obtain the data transmitted on the first-type symbol.

According to a second aspect, an embodiment of the present disclosure further provides a data processing method, including:

receiving, by a receive end, data sent by a transmit end, where the data includes data obtained after the transmit end performs inverse fast Fourier transform IFFT processing on and adds a first CP to data that is transmitted on a shared symbol and that is obtained after the transmit end preprocesses data transmitted on at least two first-type symbols in a radio frame that are serial in time domain, and the data transmitted on the shared symbol includes the data transmitted on the at least two first-type symbols;

removing, by the receive end, the first CP added to the data transmitted on the shared symbol;

performing, by the receive end, fast Fourier transform FFT processing on the data that is transmitted on the shared symbol and from which the first CP is removed; and performing, by the receive end, inverse processing of the preprocessing on the data that is transmitted on the shared symbol and on which FFT processing is performed, to obtain the data transmitted on the at least two first-type symbols that are serial in time domain.

Based on the foregoing embodiment, the radio frame further includes at least one second-type symbol, a time length of the second-type symbol is less than a time length of the shared symbol, and the data that is sent by the transmit end and that is received by the receive end further includes:

data that is obtained after the transmit end adds a second CP to time-domain data transmitted on each of the at least one second-type symbol in the radio frame.

Based on the foregoing embodiment, the performing, by the receive end, inverse processing of the preprocessing on the data from which the first CP is removed includes:

performing, by the receive end by using inverse Fourier transform, parallel-to-serial conversion, inverse overall Fourier transform, an inverse Hadamard matrix, or an inverse identity matrix, inverse processing of the preprocessing on data transmitted on at least two first-type symbols in the radio frame that are parallel.

Based on the foregoing embodiment, the first-type symbol is used to transmit uplink or downlink data, and the second-type symbol is used to transmit a reference signal or used to control information about uplink data transmission or downlink data transmission, or is used as a guard interval for uplink-downlink transition in a time division duplex TDD mode.

Based on the foregoing embodiment, the data transmitted on the first-type symbol is uplink data, and after the performing, by the receive end, inverse processing of the preprocessing on the data that is transmitted on the shared symbol and on which FFT processing is performed, to obtain the data transmitted on the at least two first-type symbols that are serial in time domain, the method further includes:

performing, by the receive end, inverse discrete Fourier transform on the data transmitted on the first-type symbol, to obtain at least two pieces of output data.

Based on the foregoing embodiment, the data transmitted on the first-type symbol is downlink data, and after the performing, by the receive end, inverse processing of the preprocessing on the data that is transmitted on the shared symbol and on which FFT processing is performed, to obtain the data transmitted on the at least two first-type symbols that are serial in time domain, the method further includes:

performing, by the receive end, parallel-to-serial conversion on the data transmitted on the first-type symbol, to obtain at least two pieces of output data.

According to a third aspect, an embodiment of the present disclosure further provides a data processing method, including: sending, by a transmit end, information to a receive end by using a hybrid frame structure, where the information includes at least one of service data, control information, and a reference signal, the hybrid frame structure includes a shared symbol and a second-type symbol, a first CP is added to the shared symbol, a second CP is added to the second-type symbol, and a length of the shared symbol is greater than a length of the second-type symbol.

Based on the foregoing embodiment, a difference between a length of the first CP and a length of the second CP is less than a preset threshold.

Based on the foregoing embodiment, a proportion of the length of the shared symbol to that of the second-type symbol is n:1, a proportion of a length of the first CP to a length of the second CP is also n:1, and n is greater than 1.

According to a fourth aspect, an embodiment of the present disclosure further provides a data processing method, including: receiving, by a receive end by using a hybrid frame structure, information sent by a transmit end, where the information includes at least one of service data, control information, and a reference signal, the hybrid frame structure includes a shared symbol and a second-type symbol, a first CP is added to the shared symbol, a second CP is added to the second-type symbol, and a length of the shared symbol is greater than a length of the second-type symbol.

Based on the foregoing embodiment, a difference between a length of the first CP and a length of the second CP is less than a preset threshold.

Based on the foregoing embodiment, a proportion of the length of the shared symbol to that of the second-type symbol is n:1, a proportion of a length of the first CP to a length of the second CP is also n:1, and n is greater than 1.

According to a fifth aspect, an embodiment of the present disclosure further provides a data processing apparatus, including:

a processing module, configured to: preprocess data transmitted on at least two first-type symbols in a radio frame that are serial in time domain, and convert the data transmitted on the at least two first-type symbols into data transmitted on a shared symbol, where the data transmitted on the shared symbol includes the data transmitted on the at least two first-type symbols, where the processing module is further configured to perform inverse fast Fourier transform IFFT processing on the data transmitted on the shared symbol; and the processing module is further configured to add a first cyclic prefix CP to the data that is transmitted on the shared symbol and on which IFFT processing is performed; and a sending module, configured to send, to a receive end, the data that is transmitted on the shared symbol and to which the first CP is added.

Based on the foregoing embodiment, the radio frame further includes at least one second-type symbol, and a time length of the second-type symbol is less than a time length of the shared symbol; and the processor is further configured to:

add a second CP to data transmitted on the second-type symbol; and send, to the receive end, the data that is transmitted on the at least one second-type symbol and to which the second CP is added and the data that is transmitted on the shared symbol and to which the first CP is added.

Based on the foregoing embodiment, the processor is configured to:

preprocess, by using interleaving Fourier transform, serial-to-parallel conversion, overall Fourier transform, a Hadamard matrix, or an identity matrix, data transmitted on at least two first-type symbols in the radio frame that are parallel.

Based on the foregoing embodiment, the first-type symbol is used to transmit uplink data or downlink data, and the second-type symbol is used to transmit a reference signal or used to control information about uplink data transmission or downlink data transmission, or is used as a guard interval for uplink-downlink transition in a time division duplex TDD mode.

Based on the foregoing embodiment, the data transmitted on the first-type symbol is uplink data, and the processing module is further configured to:

perform discrete Fourier transform on at least two pieces of input data, to obtain the data transmitted on the first-type symbol.

Based on the foregoing embodiment, the data transmitted on the first-type symbol is downlink data, and the processing module is further configured to:

perform serial-to-parallel conversion on the at least two pieces of input data, to obtain the data transmitted on the first-type symbol.

According to a sixth aspect, an embodiment of the present disclosure further provides a data processing apparatus, including:

a receiving module, configured to receive data sent by a transmit end, where the data includes data obtained after the transmit end performs inverse fast Fourier transform IFFT processing on and adds a first CP to data that is transmitted on a shared symbol and that is obtained after the transmit end preprocesses data transmitted on at least two first-type symbols in a radio frame that are serial in time domain, and the data transmitted on the shared symbol includes the data transmitted on the at least two first-type symbols; and a processing module, configured to remove the first CP added to the data transmitted on the shared symbol, where the processing module is further configured to perform fast Fourier transform FFT processing on the data that is transmitted on the shared symbol and from which the first CP is removed; and the processing module is further configured to perform inverse processing of the preprocessing on the data that is transmitted on the shared symbol and on which FFT processing is performed, to obtain the data transmitted on the at least two first-type symbols that are serial in time domain.

Based on the foregoing embodiment, the radio frame further includes at least one second-type symbol, a time length of the second-type symbol is less than a time length of the shared symbol, and the processing module is further configured to:

data that is obtained after a second CP is added to data transmitted on each of the at least one second-type symbol in the radio frame.

Based on the foregoing embodiment, the processing module is configured to:

perform, by using inverse Fourier transform, parallel-to-serial conversion, inverse overall Fourier transform, an inverse Hadamard matrix, or an inverse identity matrix, inverse processing of the preprocessing on data transmitted on at least two first-type symbols in the radio frame that are parallel.

Based on the foregoing embodiment, the first-type symbol is used to transmit uplink or downlink data, and the second-type symbol is used to transmit a reference signal or used to control information about uplink data transmission or downlink data transmission, or is used as an uplink-to-downlink switching point in a time division duplex TDD mode.

Based on the foregoing embodiment, the data transmitted on the first-type symbol is uplink data, and the processing module is further configured to:

perform inverse discrete Fourier transform on the data transmitted on the first-type symbol, to obtain at least two pieces of output data.

Based on the foregoing embodiment, the data transmitted on the first-type symbol is downlink data, and the processing module is further configured to:

perform parallel-to-serial conversion on the data transmitted on the first-type symbol, to obtain at least two pieces of output data.

According to a seventh aspect, an embodiment of the present disclosure further provides a data processing apparatus, including a sending module, where the sending module is configured to send information to a receive end by using a hybrid frame structure, where the information includes at least one of service data, control information, and a reference signal, the hybrid frame structure includes a shared symbol and a second-type symbol, a first CP is added to the shared symbol, a second CP is added to the second-type symbol, and a length of the shared symbol is greater than a length of the second-type symbol.

Based on the foregoing embodiment, a difference between a length of the first CP and a length of the second CP is less than a preset threshold.

Based on the foregoing embodiment, a proportion of the length of the shared symbol to that of the second-type symbol is n:1, a proportion of a length of the first CP to a length of the second CP is also n:1, and n is greater than 1.

According to an eighth aspect, an embodiment of the present disclosure further provides a data processing apparatus, including a receiving module, where the receiving module is configured to receive, by using a hybrid frame structure, information sent by a transmit end, where the information includes at least one of service data, control information, and a reference signal, the hybrid frame structure includes a shared symbol and a second-type symbol, a first CP is added to the shared symbol, a second CP is added to the second-type symbol, and a length of the shared symbol is greater than a length of the second-type symbol.

Based on the foregoing embodiment, a difference between a length of the first CP and a length of the second CP is less than a preset threshold.

Based on the foregoing embodiment, a proportion of the length of the shared symbol to that of the second-type symbol is n:1, a proportion of a length of the first CP to a length of the second CP is also n:1, and n is greater than 1.

According to a ninth aspect, an embodiment of the present disclosure further provides a data processing apparatus, including:

a processor, configured to: preprocess data transmitted on at least two first-type symbols in a radio frame that are serial in time domain, and convert the data transmitted on the at least two first-type symbols into data transmitted on a shared symbol, where the data transmitted on the shared symbol includes the data transmitted on the at least two first-type symbols, where the processor is further configured to perform inverse fast Fourier transform IFFT processing on the data transmitted on the shared symbol; and the processor is further configured to add a first cyclic prefix CP to the data that is transmitted on the shared symbol and on which IFFT processing is performed; and a transmitter, configured to send, to a receive end, the data that is transmitted on the shared symbol and to which the first CP is added.

According to a tenth aspect, an embodiment of the present disclosure further provides a data processing apparatus, including:

a receiver, configured to receive data sent by a transmit end, where the data includes data obtained after the transmit end performs inverse fast Fourier transform IFFT processing on and adds a first CP to data that is transmitted on a shared symbol and that is obtained after the transmit end preprocesses data transmitted on at least two first-type symbols in a radio frame that are serial in time domain, and the data transmitted on the shared symbol includes the data transmitted on the at least two first-type symbols; and a processor, configured to remove the first CP added to the data transmitted on the shared symbol, where the processor is further configured to perform fast Fourier transform FFT processing on the data that is transmitted on the shared symbol and from which the first CP is removed; and the processor is further configured to perform inverse processing of the preprocessing on the data that is transmitted on the shared symbol and on which FFT processing is performed, to obtain the data transmitted on the at least two first-type symbols that are serial in time domain.

According to the data processing method and apparatus provided in the embodiments of the present disclosure, the transmit end preprocesses the data transmitted on the at least two first-type symbols in the radio frame that are parallel, converts the data transmitted on the at least two parallel first-type symbols into the data transmitted on the shared symbol, and adds the first CP to the data transmitted on the shared symbol, so that a quantity of added CPs in the radio frame can be reduced. When a time length of a symbol is shortened because of an increase in a subcarrier spacing, compared with a prior-art solution of proportionally shortening a length of a CP on each symbol, in the embodiments of the present disclosure, a quantity of CPs is reduced, so that it can be ensured that total duration of the CPs remains unchanged, that is, CP overheads remain unchanged. In addition, duration of each CP is greater than duration of a CP obtained after the proportional shortening in the conventional technology, and therefore relatively large channel delay spread may be resisted, and a signal transmission coverage area may be increased.

BRIEF DESCRIPTION OF DRAWINGS

To describe technical solutions in embodiments of the present disclosure more clearly, the following briefly describes the accompanying drawings required for describing the embodiments. Apparently, the accompanying drawings in the following description show some embodiments of the present disclosure, and persons of ordinary skill in the art may still derive other drawings from these accompanying drawings without creative efforts.

FIG. 15 (b) and FIG. 15 (c) are a schematic structural diagram of a radio frame when a second-type symbol in FIG. 15 (a) is at different locations;

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

When data is transmitted in a wireless communications system, a channel delay is generated when the data arrives at a receive end through different propagation paths. Consequently, intersymbol interference (ISI) occurs on the data, and data transmission quality is affected. To eliminate the ISI, a cyclic prefix (CP) is introduced in a Long Term Evolution (LTE) system. To be specific, a CP is added to each symbol in a radio frame, to resist channel delay spread. With development of communications technologies, a subcarrier spacing needs to be increased to implement low-delay and high-reliability communication or communication in a high-speed movement scenario. When the subcarrier spacing is increased, a time length of each symbol in the radio frame is proportionally shortened. To ensure unchanged CP overheads, duration of the CP added to each symbol needs to be proportionally shortened based on the proportion of shortening the time length of each symbol. However, if such a data processing manner in which the duration of the CP is proportionally shortened is used, because the duration of the CP is shortened, delay spread that may be resisted in a data transmission process is also proportionally reduced. Consequently, a data transmission coverage area is reduced.

Embodiments of the present disclosure provide a data processing method and apparatus, so as to implement a relatively good capability of resisting delay spread (that is, eliminating ISI) while ensuring proper CP overheads, thereby ensuring a data transmission coverage area.

Figure 1:
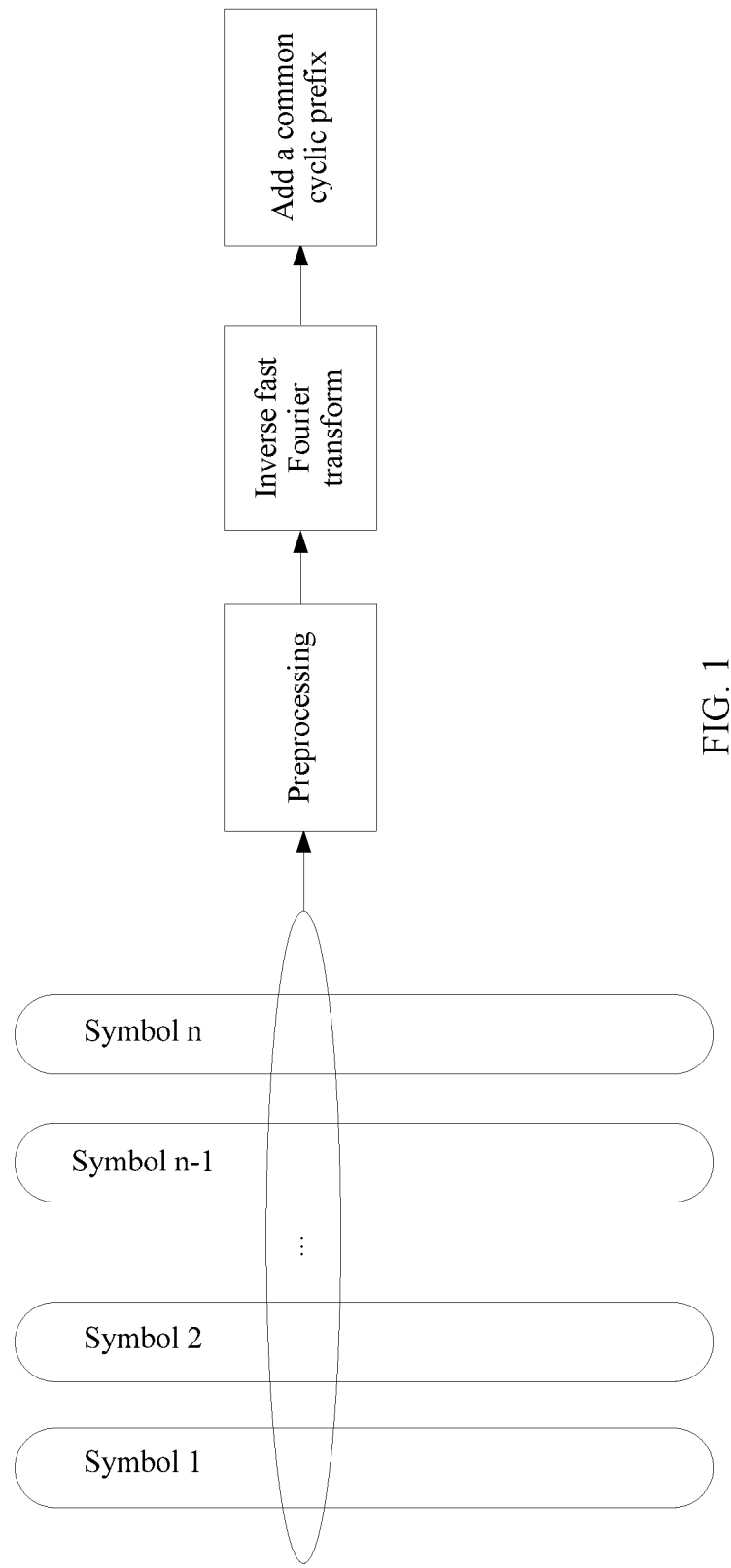
FIG. 1 is a schematic flowchart of a data processing method according to an embodiment of the present disclosure.
Figure 2:
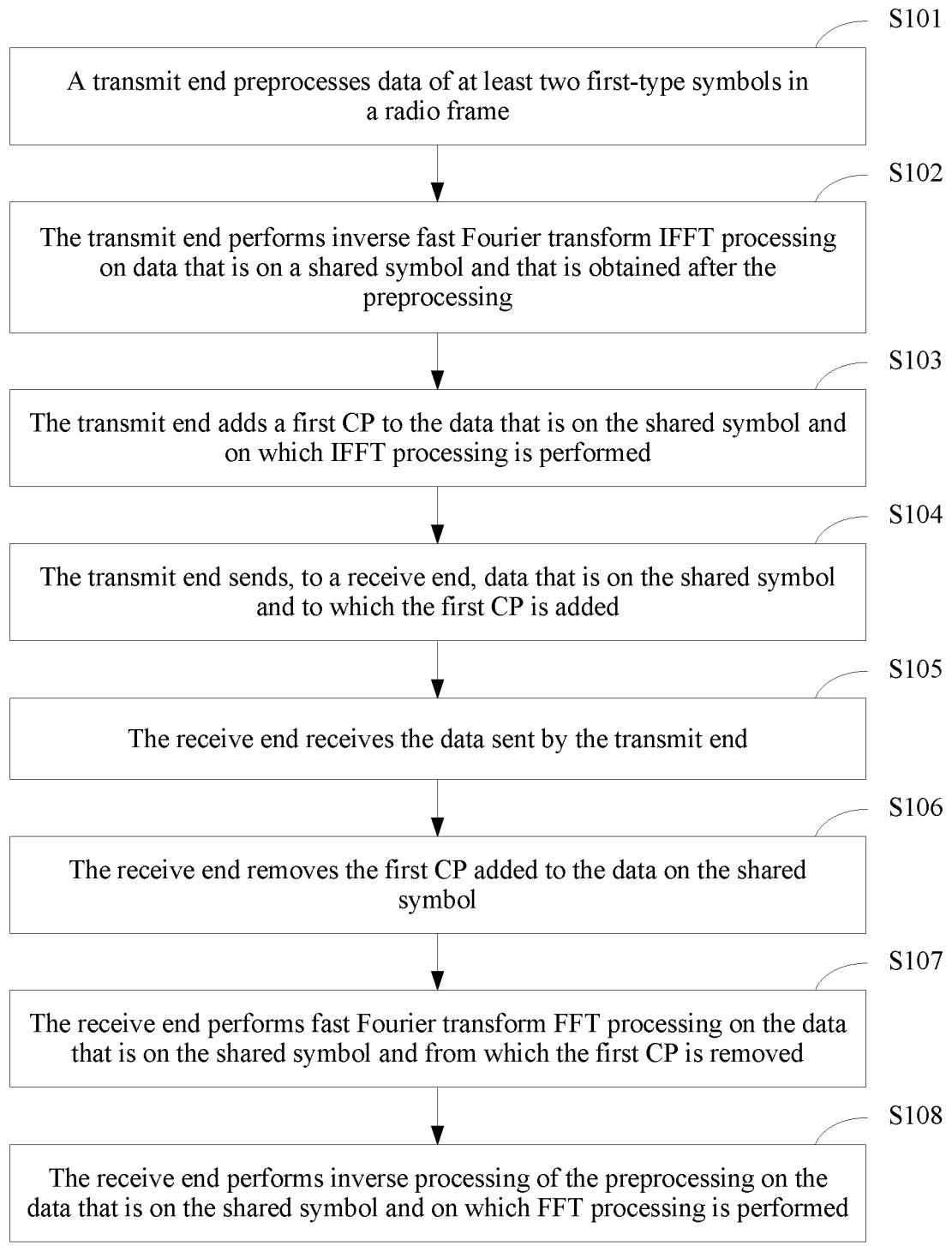
FIG. 2 is another schematic flowchart of a data processing method according to an embodiment of the present disclosure.

FIG. 1 is a schematic flowchart of a data processing method according to an embodiment of the present disclosure. FIG. 2 is another schematic flowchart of a data processing method according to an embodiment of the present disclosure.

Referring to FIG. 1 and FIG. 2, the data processing method in this embodiment of the present disclosure includes the following steps.

S101. A transmit end preprocesses data transmitted on at least two first-type symbols in a radio frame that are serial in time domain, and converts the data transmitted on the at least two first-type symbols into data transmitted on a shared symbol, where the data transmitted on the shared symbol includes the data transmitted on the at least two first-type symbols.

Specifically, the transmit end is a base station and the receive end is user equipment, or the transmit end is user equipment and the receive end is a base station, or both the transmit end and the receive end may be user equipment. The transmit end and the receive end are configured to implement data transmission between the base station and the user equipment or data transmission between user equipments. The transmit end or the receive end may alternatively be a chip, to implement functions of the transmit end or the receive end.

Figure 3:
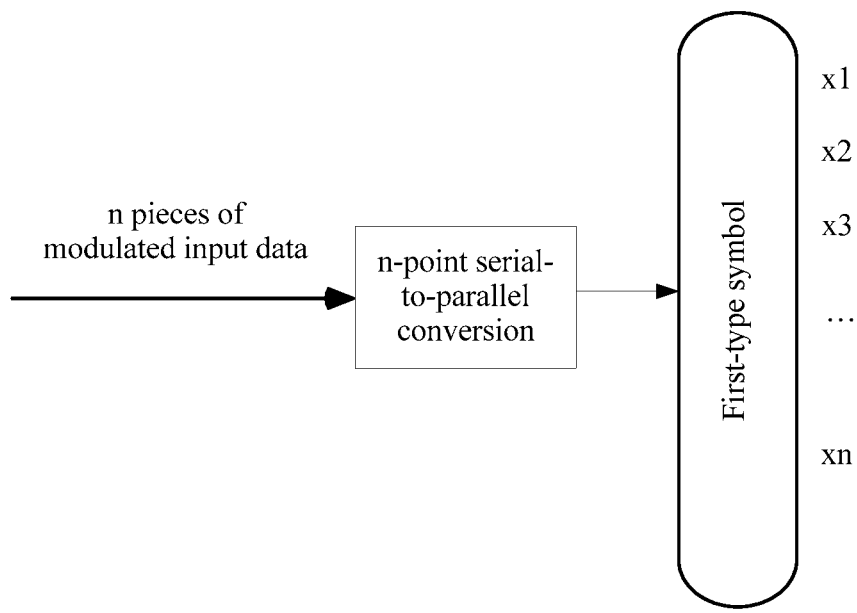
FIG. 3 is a schematic diagram of a process of forming a first-type symbol when downlink data is sent according to an embodiment of the present disclosure.

FIG. 3 is a schematic diagram of a process of forming a first-type symbol when downlink data is sent according to an embodiment of the present disclosure.

Referring to FIG. 3, in a downlink multicarrier application scenario, that is, when downlink data is transmitted, n-point serial-to-parallel conversion is performed on n pieces of modulated input data to form the data $x_1$ to $x_n$ transmitted on the first-type symbol. x represents the data transmitted on the first-type symbol, n represents an amount of the data transmitted on the first-type symbol, and n is an integer greater than or equal to 1. Modulation described in the present disclosure may be any existing mature modulation technology, for example, quadrature phase shift keying (QPSK) modulation, quadrature amplitude modulation (QAM), or the like used in a current LTE system.

Figure 4:
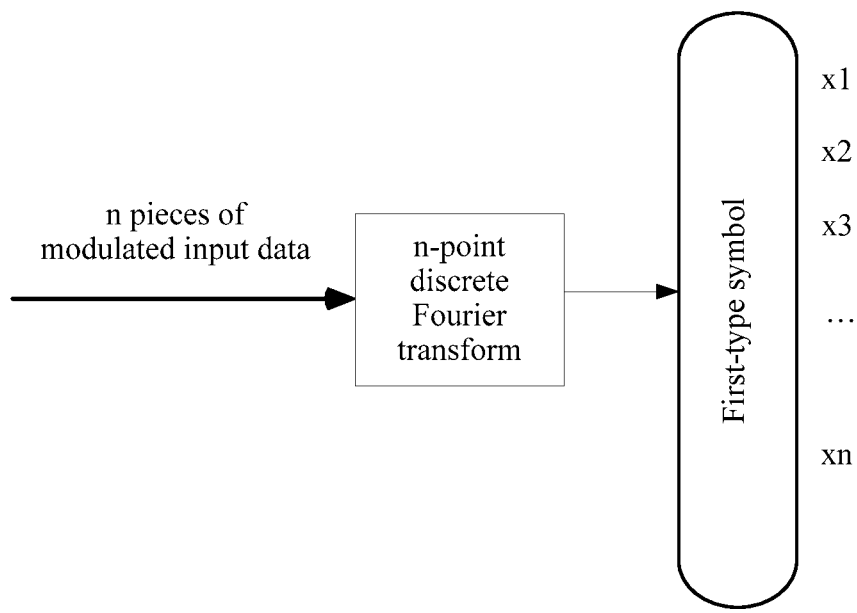
FIG. 4 is a schematic diagram of a process of forming a first-type symbol when uplink data is sent according to an embodiment of the present disclosure.

FIG. 4 is a schematic diagram of a process of forming a first-type symbol when uplink data is sent according to an embodiment of the present disclosure.

Referring to FIG. 4, in an uplink single-carrier application scenario, serial-to-parallel conversion is performed on n pieces of modulated input data on which n-point discrete Fourier transform (DFT) is performed, to form the data $x_1$ to $x_n$ transmitted on the first-type symbol.

Specifically, a radio frame in LTE includes two or more first-type symbols 1 to m (as shown in FIG. 1) that are serial in time domain, and m is an integer greater than or equal to 1. After being preprocessed, data transmitted on the two or more first-type symbols may share a CP. The transmit end preprocesses the data transmitted on the two or more first-type symbols, and converts the data transmitted on the two or more serial first-type symbols into data transmitted on the shared symbol. The data on the shared symbol includes the data transmitted on the two or more first-type symbols, to be specific, the data transmitted on the two or more first-type symbols develops in frequency domain corresponding to the shared symbol.

Figure 5:
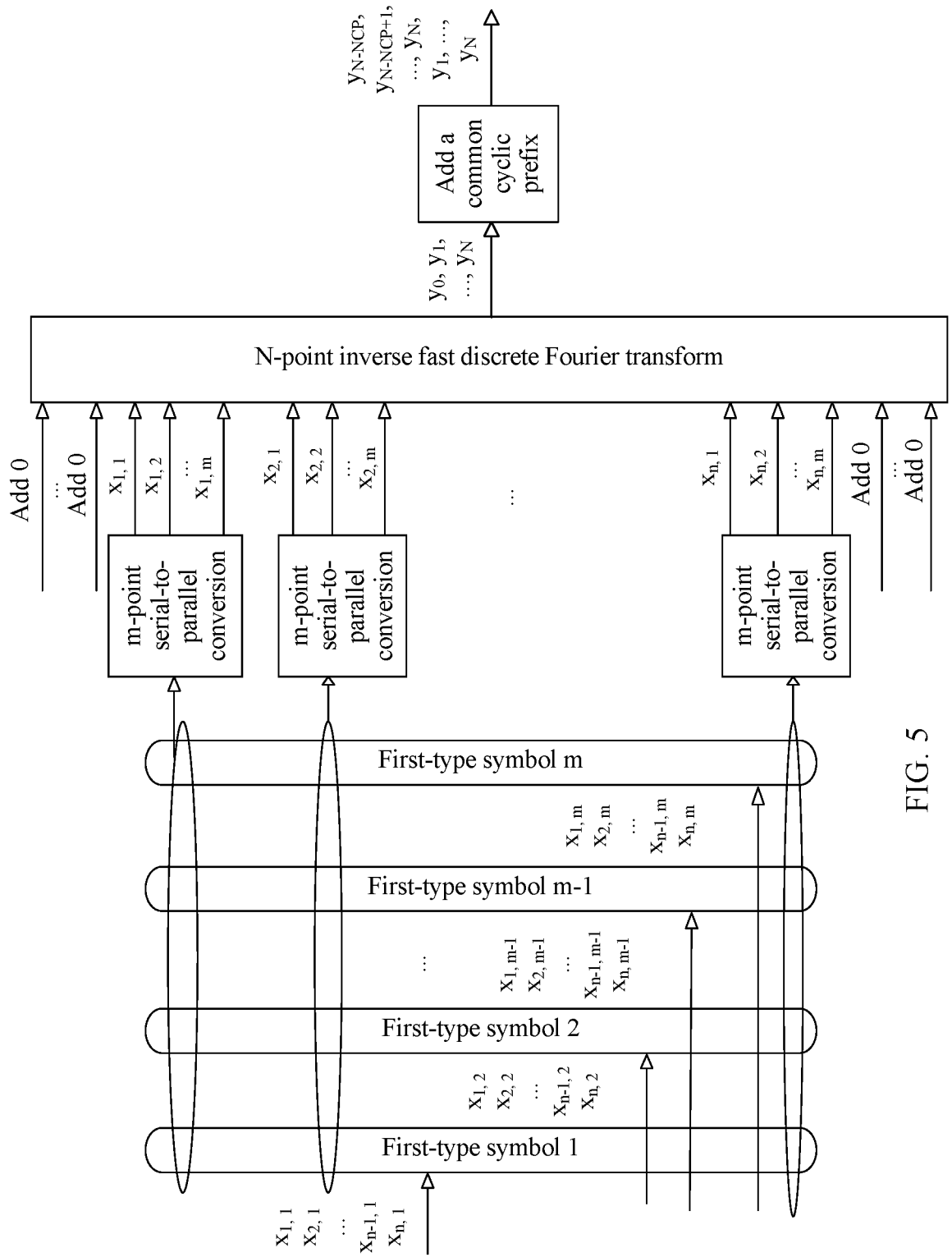
FIG. 5 is a schematic flowchart of processing downlink data by using a data processing method according to an embodiment of the present disclosure.

Optionally, the transmit end may preprocess, by using interleaving Fourier transform, serial-to-parallel conversion, overall Fourier transform, a Hadamard matrix, or an identity matrix, data transmitted on two or more first-type symbols in the radio frame that are parallel. For a specific processing procedure, refer to FIG. 5 to FIG. 10 and the following descriptions. The data transmitted on the first-type symbol and data transmitted on the second-type symbol may be a combination of at least one of uplink or downlink data, an uplink or downlink reference signal (RS), and uplink or downlink control information. A process of preprocessing the data transmitted on the two or more first-type symbols in the radio frame that are parallel is specifically described below with reference to FIG. 5 to FIG. 10 according to the data processing method in this embodiment of the present disclosure. Two most crucial operations or submodules are the serial-to-parallel conversion and the Fourier transform, m-point serial-to-parallel conversion is to convert m pieces of serial data into parallel data, and m-point or m*n-point Fourier transform is existing typical standard practice of the Fourier transform. FIG. 5 is a schematic flowchart of processing downlink data by using a data processing method according to an embodiment of the present disclosure.

Referring to FIG. 5, specifically, based on the method shown in FIG. 3, n-point serial-to-parallel conversion is separately performed on m pieces of input data to form m first-type symbols, data on a $j^{th}$ first-type symbol is $x_{1,j}$, $x_{2,j}, \ldots$, and $x_{n,j}$, and a value of j ranges from 1 to m. Then, $i^{th}$ piece of data $x_{i,1}, x_{i,2}, \ldots$, and $x_{i,m}$ on each first-type symbol is preprocessed through serial-to-parallel conversion to obtain the shared symbol, and a value of i ranges from 1 to n. Specifically, m-point serial-to-parallel conversion is performed on the $i^{th}$ piece of data $x_{i,1}, x_{i,2}, \ldots$, and $x_{i,m}$ in each piece of input data to obtain the shared symbol, and the value of i ranges from 1 to n.

Figure 6:
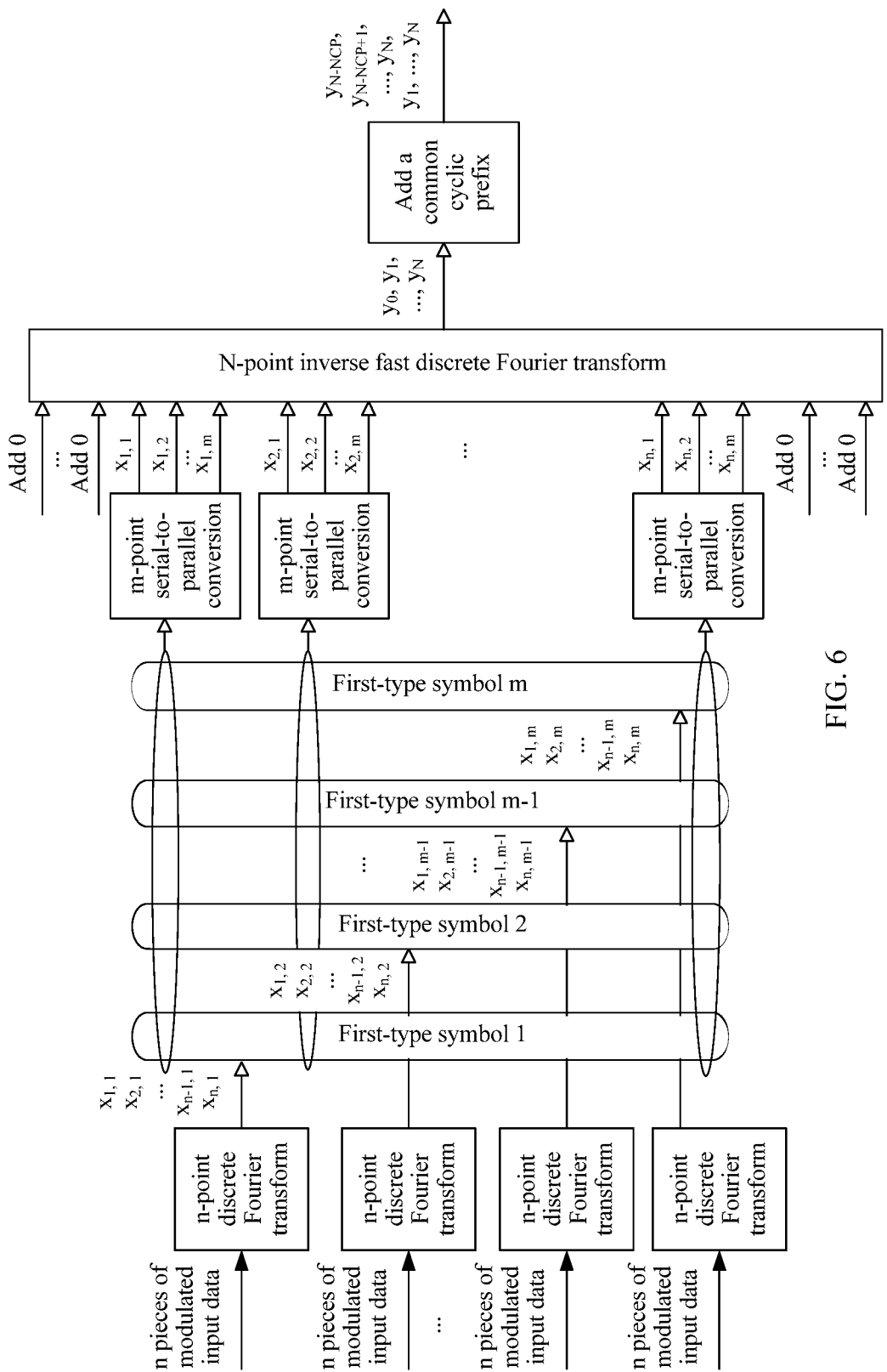
FIG. 6 is a schematic flowchart of processing uplink data by using a data processing method according to an embodiment of the present disclosure.

FIG. 6 is a schematic flowchart of processing uplink data by using a data processing method according to an embodiment of the present disclosure.

Referring to FIG. 6, based on the method shown in FIG. 4, n-point discrete Fourier transform is performed on m pieces of input data to form m first-type symbols, data on a $i^{th}$ first-type symbol is $x_{1,j}, x_{2,j}, \ldots$, and $x_{n,j}$, and a value of j ranges from 1 to m. Then, $i^{th}$ piece of data $x_{i,1}, x_{i,2}, \ldots$, and $x_{i,m}$ on each first-type symbol is preprocessed through m-point serial-to-parallel conversion to obtain the shared symbol, and a value of i ranges from 1 to n. Finally, it can be learned that time-domain data transmitted on the shared symbol is $y_0, y_1, \ldots$, and $y_N$, y represents a data sample point transmitted on the shared symbol in time domain, and N represents a quantity of data sample points on the shared symbol in time domain.

Figure 7:
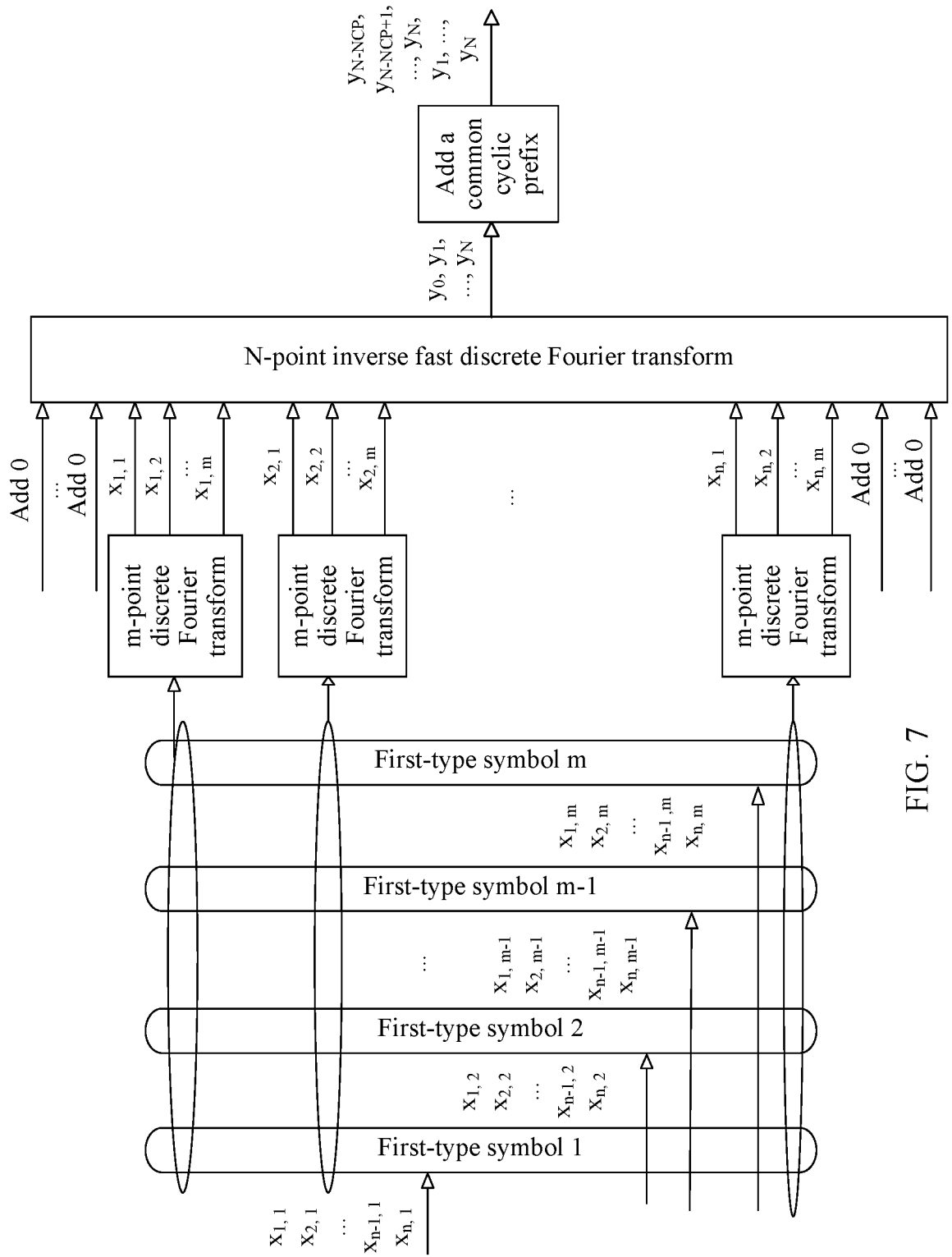
FIG. 7 is a schematic flowchart of processing downlink data by using a data processing method according to another embodiment of the present disclosure.

FIG. 7 is a schematic flowchart of processing downlink data by using a data processing method according to another embodiment of the present disclosure.

Referring to FIG. 7, specifically, based on the method shown in FIG. 3, n-point serial-to-parallel conversion is performed on m pieces of input data to form m first-type symbols, data on a $i^{th}$ first-type symbol is $x_{1,j}, x_{2,j}, \ldots$, and $x_{n,j}$, and a value of j ranges from 1 to m. Then, the first-type symbol is preprocessed through interleaving DFT transform to obtain the shared symbol. Specifically, the interleaving DFT transform is to perform m-point discrete Fourier transform DFT on $i^{th}$ piece of data $x_{i,1}, x_{i,2}, \ldots$, and $x_{i,m}$ on each first-type symbol, and a value of i ranges from 1 to n.

Figure 8:
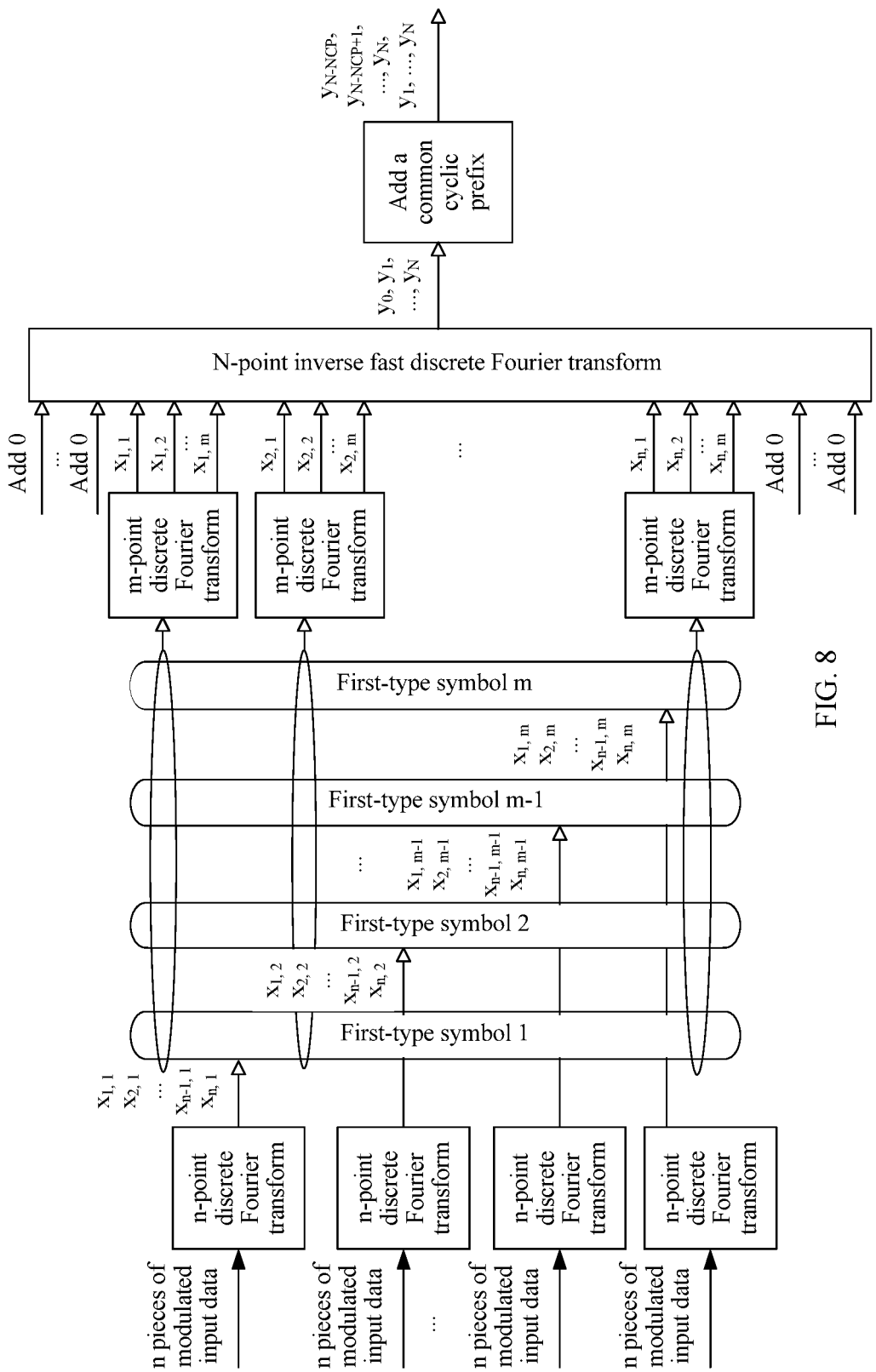
FIG. 8 is a schematic flowchart of processing uplink data by using a data processing method according to another embodiment of the present disclosure.

FIG. 8 is a schematic flowchart of processing uplink data by using a data processing method according to another embodiment of the present disclosure.

Referring to FIG. 8, specifically, based on the method shown in FIG. 4, n-point discrete Fourier transform DFT is separately performed on m pieces of input data to form m first-type symbols, data on a $i^{th}$ first-type symbol is $x_{1,j}$, $x_{2,j}, \ldots$, and $x_{n,j}$, and a value of j ranges from 1 to m. Then, the first-type symbol is preprocessed through interleaving DFT transform to obtain the shared symbol. Specifically, the interleaving DFT transform is to perform m-point discrete Fourier transform DFT on $i^{th}$ piece of data $x_{i,1}, x_{i,2}, \ldots$, and $x_{i,m}$ on each first-type symbol, and a value of i ranges from 1 to n.

Figure 9:
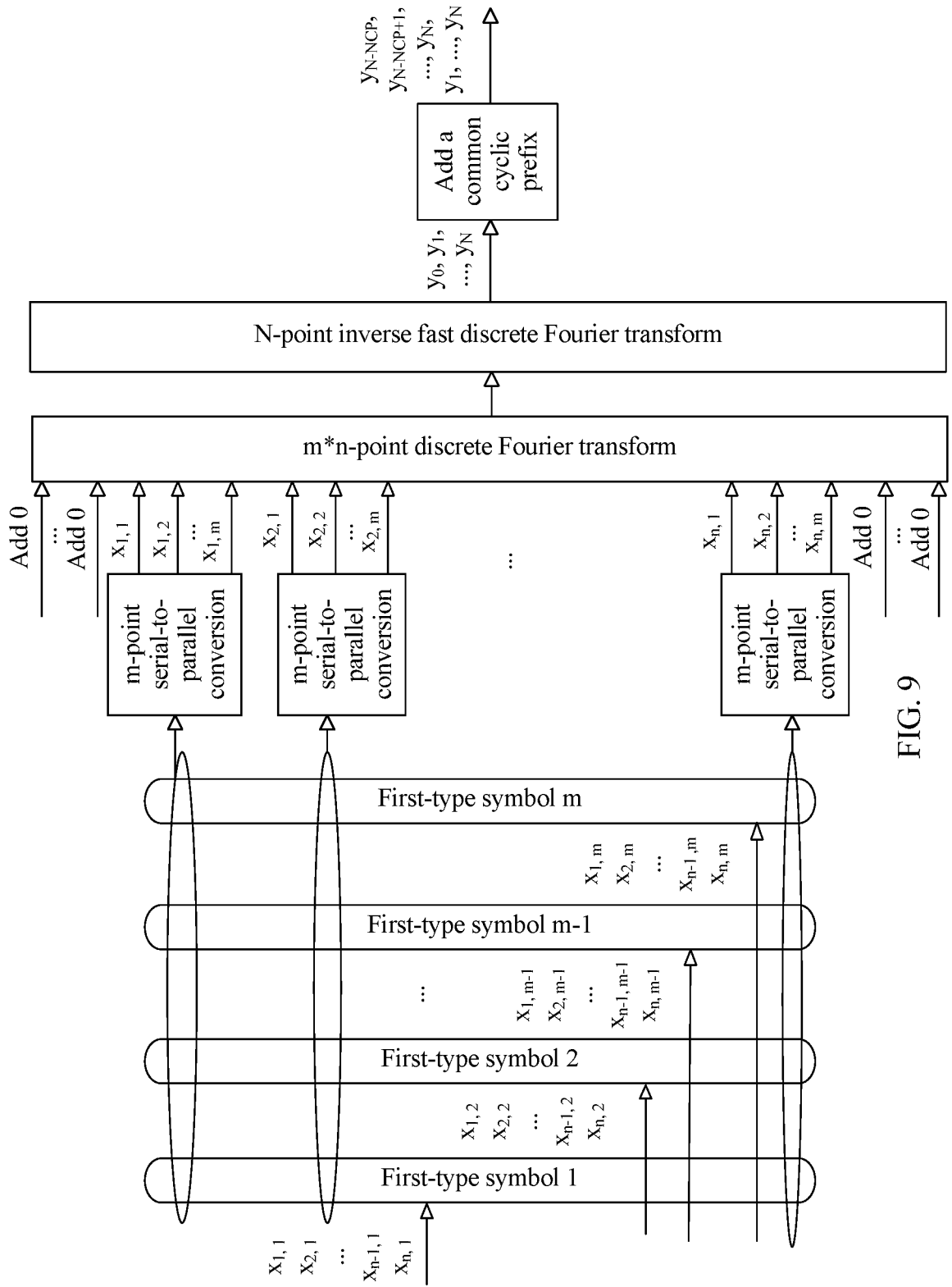
FIG. 9 is a schematic flowchart of processing downlink data by using a data processing method according to another embodiment of the present disclosure.

FIG. 9 is a schematic flowchart of processing downlink data by using a data processing method according to another embodiment of the present disclosure.

Referring to FIG. 9, specifically, based on the method shown in FIG. 3, n-point serial-to-parallel conversion is performed on m pieces of input data to form m first-type symbols, data on a $i^{th}$ first-type symbol is $x_{1,j}, x_{2,j}, \ldots$, and $x_{n,j}$, and a value of j ranges from 1 to m. Then, the first-type symbol is preprocessed through overall DFT transform to obtain the shared symbol. Specifically, the overall DFT transform is to overall perform m*n-point DFT transform on m*n pieces of data on the m first-type symbols.

Figure 10:
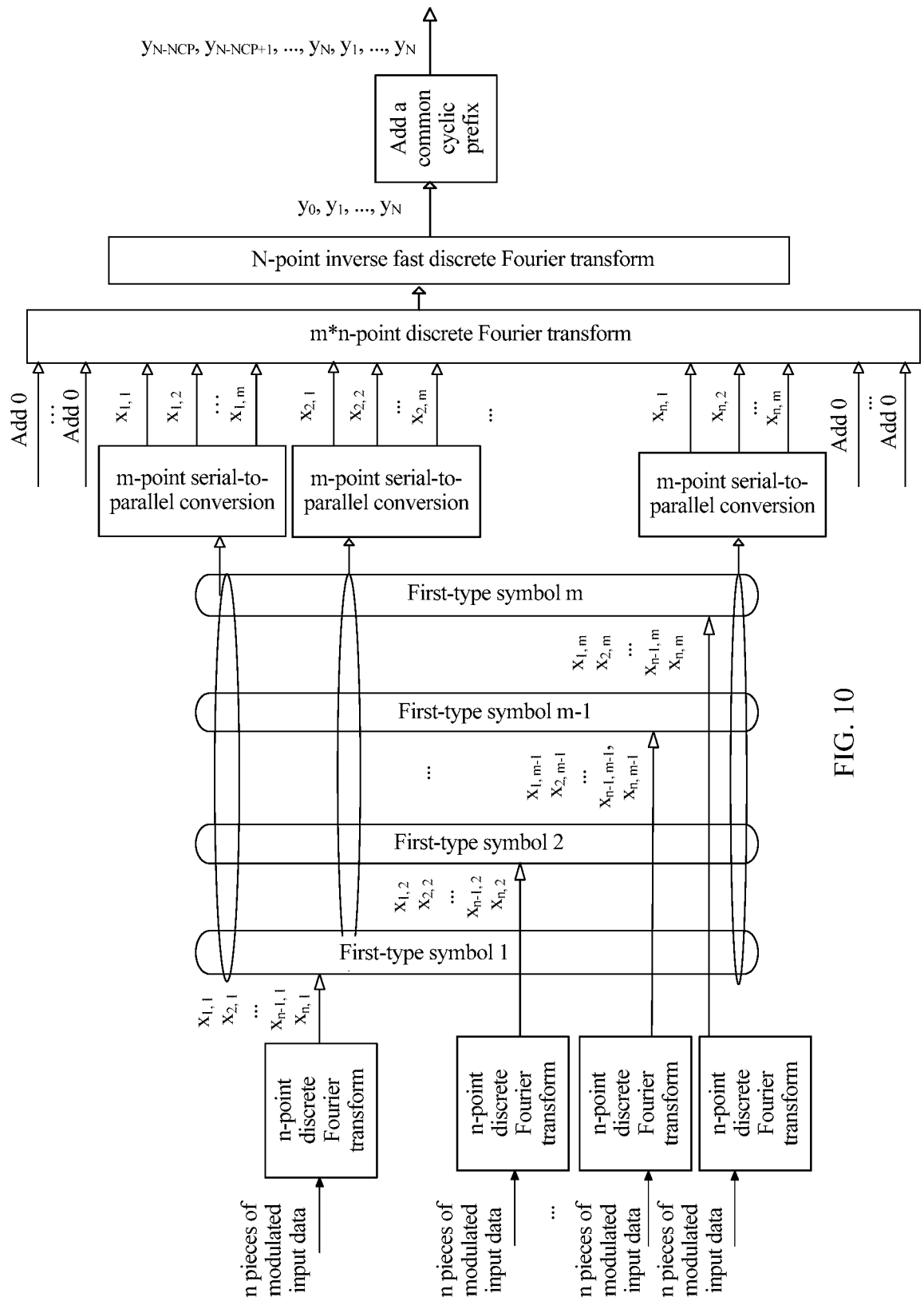
FIG. 10 is a schematic flowchart of processing downlink data by using a data processing method according to another embodiment of the present disclosure.

FIG. 10 is a schematic flowchart of processing downlink data by using a data processing method according to another embodiment of the present disclosure.

Referring to FIG. 10, specifically, based on the method shown in FIG. 4, n-point discrete Fourier transform is separately performed on m pieces of input data to form m first-type symbols, data on a $i^{th}$ first-type symbol is $x_{1,j}$, $x_{2,j}, \ldots$, and $x_{n,j}$, and a value of j ranges from 1 to m. Then, the first-type symbol is preprocessed through overall DFT transform to obtain the shared symbol. Specifically, m*n-point DFT transform is overall performed on m*n pieces of data in the m pieces of data.

It should be noted that the data, in the radio frame, that is used for the preprocessing may be uplink single carrier frequency division multiple access (SC-FDMA) data or downlink orthogonal frequency division multiplexing (OFDM) data, or may be filter bank multicarrier (FBMC) data.

S102. The transmit end performs inverse fast Fourier transform (IFFT) processing on the data that is transmitted on the shared symbol and that is obtained after the preprocessing. The IFFT processing is used to generate an OFDM time-domain signal.

S103. The transmit end adds a first CP to the data that is transmitted on the shared symbol and on which IFFT processing is performed.

Specifically, the first CP is shared by the data transmitted on the two or more first-type symbols. After the data transmitted on the at least two first-type symbols is converted into the data transmitted on the shared symbol, the first CP is added to the data transmitted on the shared symbol, to resist channel delay spread generated in a transmission process by the data transmitted on the two or more first-type symbols. For example, the shared symbol obtained after the IFFT processing, namely, an output result of S102 is $y_1, y_2, \ldots$, and $y_N$, y is a data sample point on the shared symbol, and N is a quantity of data sample points of the shared symbol in time domain. A signal sample point in the first CP is $y_{N-Ncp}, y_{N-Ncp+1}, \ldots$, and $y_N$, and Ncp is a quantity of sample points in the first CP. A data sample point included in the data output after the first CP is added to the shared symbol is $y_{N-Ncp}, y_{N-Ncp+1}, \ldots, y_N, y_1, y_2, \ldots$, and $y_N$.

S104. The transmit end sends, to a receive end, the data that is transmitted on the shared symbol and to which the first CP is added.

According to the data processing method in this embodiment of the present disclosure, compared with the conventional technology in which each first-type symbol has a CP, in this embodiment of the present disclosure, one CP is added to one shared symbol into which a plurality of first-type symbols are converted, so that a quantity of CPs used in the radio frame is reduced. In this way, it can be ensured that each CP has relatively long duration as much as possible without increasing total duration of all the CPs (namely, CP overheads), thereby enhancing a capability of resisting channel delay spread.

Based on the foregoing embodiment, the radio frame used in the data processing method in this embodiment of the present disclosure further includes at least one second-type symbol, and a time length of the second-type symbol is less than a time length of the shared symbol.

The data processing method further includes:

adding, by the transmit end, a second CP to data transmitted on the second-type symbol; and sending, by the transmit end to the receive end, the data that is transmitted on the at least one second-type symbol and to which the second CP is added and the data that is transmitted on the shared symbol and to which the first CP is added.

Specifically, the first-type symbol is used to send uplink or downlink data, and the second-type symbol is used to send a reference signal or control information.

Optionally, to reduce overheads of the radio frame, the second-type symbol may alternatively be used to send uplink or downlink data.

Figure 11:
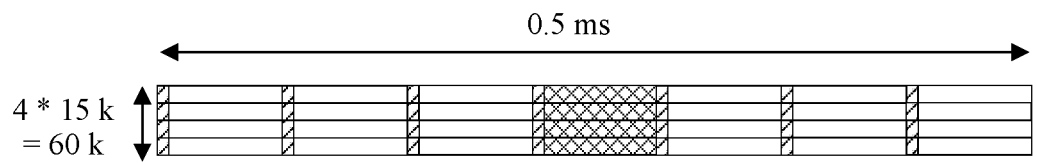
FIG. 11 is a schematic structural diagram of an uplink 1-timeslot radio frame used when a 15 KHz subcarrier spacing is used in an existing LTE standard.
Figure 12:
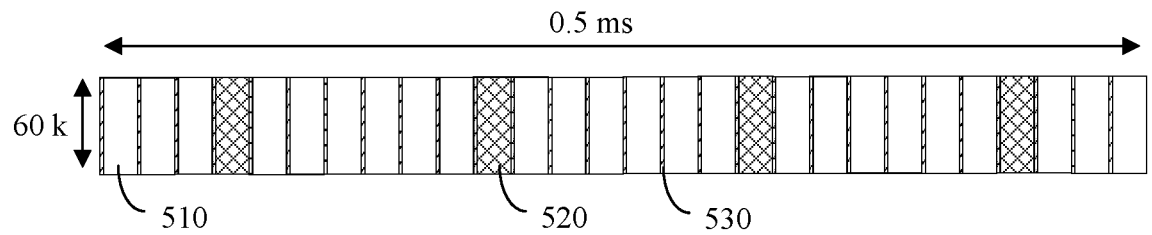
FIG. 12 is a schematic structural diagram of a radio frame on which proportional scaling is performed by using a 60 KHz subcarrier spacing based on FIG. 4.
Figure 13:
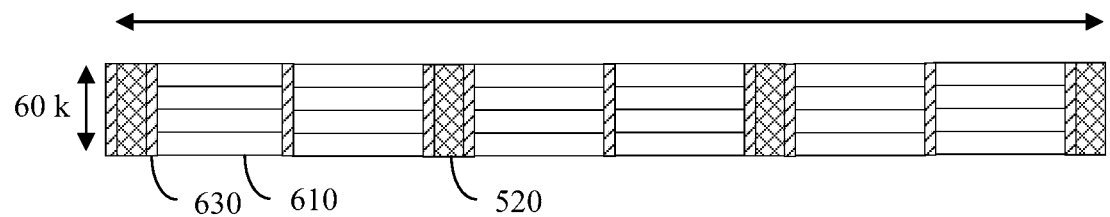
FIG. 13 is a schematic structural diagram of a radio frame obtained after a radio frame shown in FIG. 5 is processed by using a data processing method according to an embodiment of the present disclosure.

FIG. 11 is a schematic structural diagram of an uplink 1-timeslot radio frame used when a 15 KHz subcarrier spacing is used in an existing LTE standard. FIG. 12 is a schematic structural diagram of a radio frame on which proportional scaling is performed by using a 60 KHz subcarrier spacing based on FIG. 4. FIG. 13 is a schematic structural diagram of a radio frame obtained after a radio frame shown in FIG. 5 is processed by using a data processing method according to an embodiment of the present disclosure.

Specifically, referring to FIG. 11 to FIG. 13, the data processing method in this embodiment of the present disclosure aims to process the radio frame shown in FIG. 5, to obtain the radio frame structure shown in FIG. 6.

Specifically, the radio frame shown in FIG. 12 includes a first-type symbol 510 and a second-type symbol 520, and a CP 530 is added to each first-type symbol 510 and each second-type symbol 520.

As shown in FIG. 13, after the first-type symbol 510 in the radio frame shown in FIG. 12 is processed by using the data processing method in this embodiment of the present disclosure, a plurality of first-type symbols 510 in FIG. 12 are converted into a shared symbol 610, and a first CP 630 is added to the shared symbol 610.

The first-type symbol 510 is a data symbol for sending uplink or downlink data, and the second-type symbol 520 is used to carry an RS, control information, or a time interval. Specifically, in this embodiment, the solutions of the present disclosure are described in detail by using an example in which the second-type symbol 520 carries and sends the RS. That is, the second-type symbol 520 is an RS symbol.

Compared with the existing radio frame structure, the radio frame structure used in FIG. 13 has the following two advantages.

1. For same CP overheads (the CP overheads in the existing LTE standard are 6.67%), compared with a 60 KHz direct scaling-based proportional shortening scheme in LTE, a CP-shared radio frame structure used in the data processing method in this embodiment of the present disclosure can support a longer CP. In this way, a capability of resisting a multipath delay is stronger, and more channel models are supported. Table 1 is a comparison table of CP duration and a supported channel in three frame structures shown in FIG. 11 to FIG. 13 when CP overheads are set to 6.67%. For details, refer to Table 1.

TABLE 1

|  | 15 KHz frame structure | 60 KHz proportional-scaling frame structure | 60 KHz CP-shared frame structure |
| --- | --- | --- | --- |
| CP duration | 4.76 microseconds | 1.19 µs | 3.33 µs |
| Supported channel model | ETU, EVA, EPA | EPA | EVA, EPA |

ETU represents an extended typical urban model, EVA represents an extended vehicle A model, and EPA represents an extended pedestrian A model. 2. Overheads of an RS symbol are provided (a proportion of a quantity of RS symbols to a quantity of data symbols is 1:6). Compared with an existing 15 KHz frame structure in LTE, RS density in the 60 KHz CP-shared frame structure used in this embodiment of the present disclosure is higher in time domain. In this way, a capability of resisting a channel estimation performance loss caused by a high speed (a fast channel time domain change) and inter-carrier interference (ICI) is stronger, and a frequency offset range that may be estimated is larger.

Figure 14:
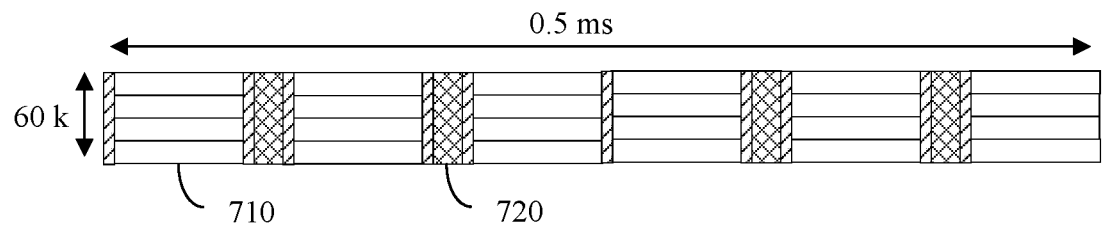
FIG. 14 is a schematic structural diagram of another radio frame obtained after a radio frame shown in FIG. 5 is processed by using a data processing method according to an embodiment of the present disclosure.

FIG. 14 is a schematic structural diagram of another radio frame obtained after a radio frame shown in FIG. 12 is processed by using a data processing method according to an embodiment of the present disclosure.

Referring to FIG. 7, compared with the radio frame shown in FIG. 13, a location of an RS symbol is adjusted in the radio frame shown in FIG. 14. Specifically, one timeslot of the radio frame includes two symmetric parts, each part includes three shared symbols 710 and two second-type symbols (RS symbols) 720, and each RS symbol 720 is located between two adjacent shared symbols 710.

In FIG. 11 to FIG. 13, the existing LTE standard is used, and it is set that one timeslot is 0.5 ms. If the radio frame structure shown in FIG. 14 is used, a transmission time interval may be minimized to 0.25 ms, and the first three shared symbols and the first two second-type symbols in FIG. 14 are included, to adapt to a low-delay and high-reliability service. In addition, because the RS symbols are more evenly distributed in time domain, frequency offset estimation is facilitated.

Referring to Table 1, when the radio frame structures in the foregoing embodiments are used, compared with a CP length in a 15 KHz frame structure in existing LTE, a capability of each CP length to resist delay spread is still partially lost.

Therefore, based on the foregoing embodiment, to further ensure a capability of resisting delay spread in a data transmission process, based on the foregoing embodiment, there are at least two second-type symbols used to send a reference signal, and duration of one of the second-type symbols used to send the reference signal is evenly allocated to second CPs of other second-type symbols and the shared CP.

Figure 15:
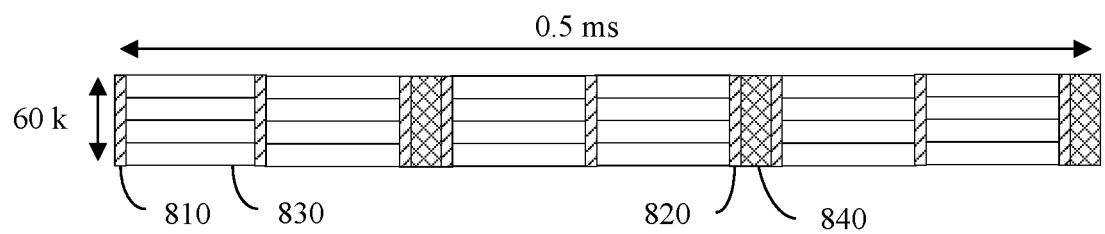
FIG. 15 (a) is a schematic structural diagram of another radio frame obtained after a radio frame shown in FIG. 5 is processed by using a data processing method according to an embodiment of the present disclosure.
Figure 15:
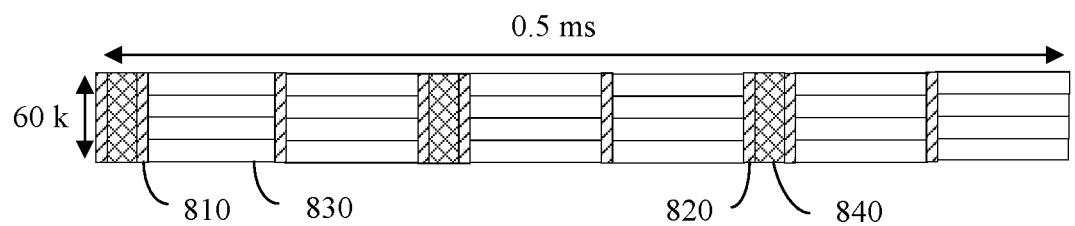
Figure 15:
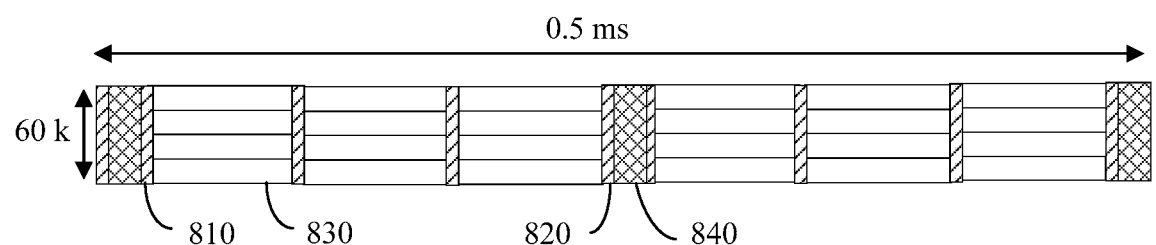

FIG. 15 (a) is a schematic structural diagram of another radio frame obtained after a radio frame shown in FIG. 12 is processed by using a data processing method according to an embodiment of the present disclosure. FIG. 15 (b) and FIG. 15 (c) are a schematic structural diagram of a radio frame when a second-type symbol in FIG. 15 (a) is at different locations.

Specifically, referring to FIG. 15 (a), another radio frame structure is used in the data processing method in this embodiment of the present disclosure. To be specific, one of the second-type symbols (the RS symbols) 520 in FIG. 12 is used as a CP. Compared with the radio frame structures shown in FIG. 13 and FIG. 14, one RS symbol is deducted from the radio frame structure shown in FIG. 15, and duration of the RS symbol is evenly allocated to all first CPs 810 and second CPs 820. Referring to both FIG. 15 (b) and FIG. 15 (c), a location of the second-type symbol 840 in the radio frame may be adjusted.

Table 2 is a comparison table of CP duration and a supported channel in three frame structures shown in FIG. 11, FIG. 12, and FIG. 15 when CP overheads are set to 6.67%.

TABLE 2

|  | 15 KHz frame structure | 60 KHz proportional-scaling frame structure | 60 KHz CP-shared frame structure |
| --- | --- | --- | --- |
| CP duration | 4.76 microseconds | 1.19 μs | 5.56 μs |
| Supported channel model | ETU, EVA, EPA | EPA | ETU, EVA, EPA |

Specifically, referring to Table 2, the frame structure, shown in FIG. 15, in which each CP length is 5.56 μs is used, and a capability of resisting channel delay spread in a data transmission process is improved.

Figure 16:
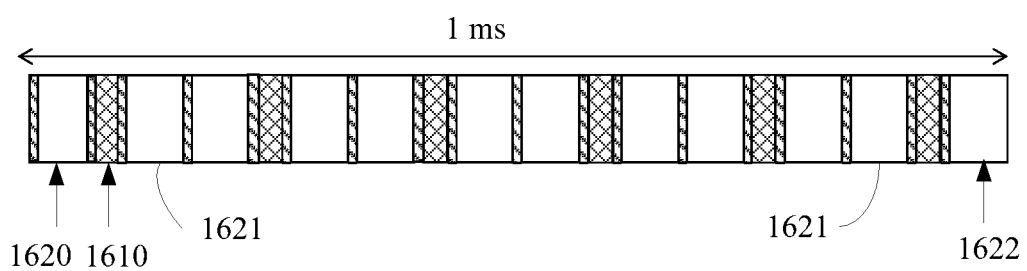
FIG. 16 is a schematic structural diagram of another radio frame used in a data processing method according to an embodiment of the present disclosure.

FIG. 16 is a schematic structural diagram of another radio frame used in a data processing method according to an embodiment of the present disclosure.

Referring to FIG. 16, in an application scenario of Internet of Vehicles (e.g. vehicle-to-vehicle, V2V for short), in the radio frame structure used in the data processing method in this embodiment of the present disclosure, one TTI is 1 ms, and the TTI totally includes 18 OFDM symbols, including six second-type symbols 1610 with a 60 KHz subcarrier spacing, and 12 shared symbols 1620, 1621, and 1622 with a 15 KHz subcarrier spacing. Duration of each second-type symbol 1610 is 16.67 μs, and the second-type symbol 1610 is used to carry pilot information. Each shared symbol 1620, 1621, or 1622 may be obtained after four 60 KHz first-type symbols 510 shown in FIG. 5 are preprocessed, and duration of each shared symbol is 66.67 μs. In the twelve shared symbols 1620, the first shared symbol 1620 is used for automatic gain control (AGC), and the AGC is an automatic control method in which a gain of an amplification circuit automatically adjusts with signal strength; 10 shared symbols 1621 in the middle are used for data transmission; and the last shared symbol 1622 is used as a guard interval (GP).

Table 3 shows a specific parameter of the radio frame structure in a 10 MHz bandwidth configuration.

TABLE 3

| Transmission bandwidth (megahertz) | TTI length (millisecond) | Length of the shared symbol (microsecond/a quantity of time domain samples) | Length of the second-type symbol (microsecond/a quantity of time domain samples) | CP length (microsecond/a quantity of time domain samples) |
| --- | --- | --- | --- | --- |
| 10 | 1 | 66.67/1024 | 16.67/256 | 5.47/84 for 12 CPs 5.73/88 for six CPs |

It can be learned from FIG. 16 and Table 3 that only two shared symbols are separated between two adjacent RS symbols, namely, second-type symbols, and duration is approximately 150 μs. In this way, a capability of resisting a channel estimation performance loss caused by a high speed (a fast channel time domain change) is extremely strong, and a frequency offset range that may be estimated is also extremely large, and is 3.5 KHz. In addition, both the duration of the first CP of the shared symbol and that of the second CP of the second-type symbol are longer than 5 μs, and therefore, a capability of resisting ISI is also extremely strong.

Figure 17:
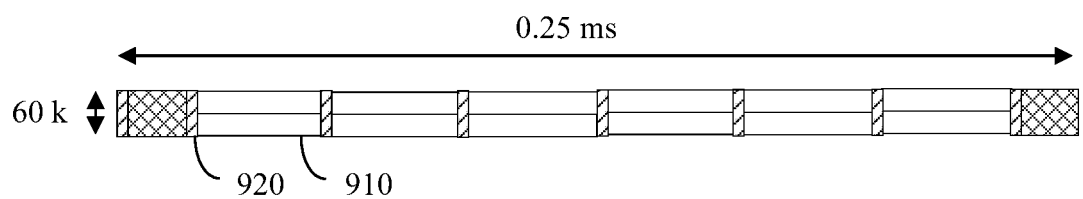
FIG. 17 is a schematic structural diagram of another radio frame used in a data processing method according to an embodiment of the present disclosure.

FIG. 17 is a schematic structural diagram of another radio frame used in a data processing method according to an embodiment of the present disclosure.

Referring to FIG. 17, in this embodiment of the present disclosure, duration of one timeslot is shortened to 0.25 millisecond, and a length of a data symbol is shortened by half compared with the foregoing embodiments, thereby enhancing a capability of resisting ICI. In addition, because the length of the data symbol is closer to a length of an RS symbol, frequency domain interpolation performance in channel estimation is better. In the radio frame structure shown in FIG. 17, one first CP 920 is shared after two 60 KHz first-type symbols (data symbols) 510 are converted into one shared symbol 910.

Figure 18:
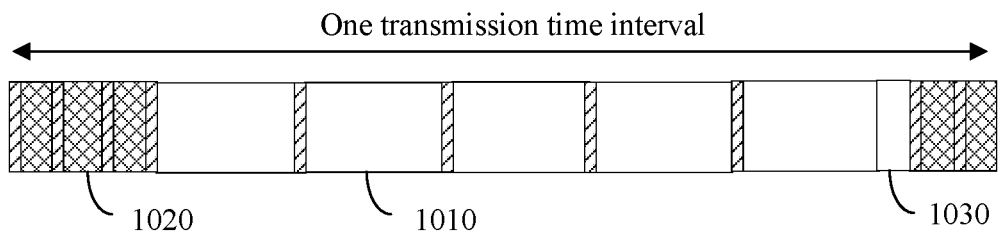
FIG. 18 (a) and FIG. 18 (b) are a schematic structural diagram of another radio frame used in a data processing method according to an embodiment of the present disclosure.
Figure 18:
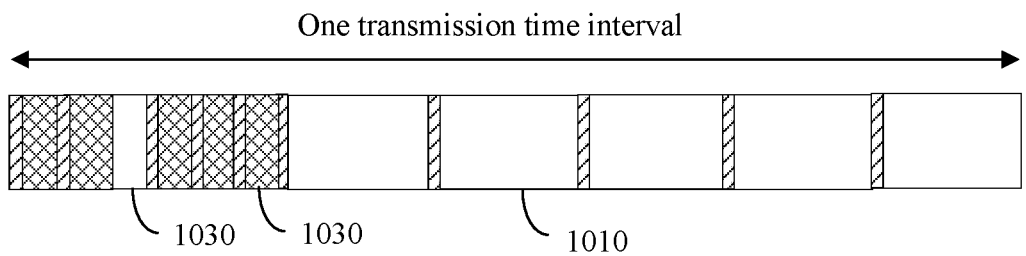

FIG. 18 (a) and FIG. 18 (b) are a schematic structural diagram of another radio frame used in a data processing method according to an embodiment of the present disclosure. Radio frames shown in FIG. 18 (a) and FIG. 18 (b) are in a frame structure adapting to a self-contained design. In the self-contained frame structure design, a guard interval for uplink-downlink transition, data information, uplink and downlink control information, or feedback information need to coexist in a same frame, so that an uplink or downlink feedback of current communication may be completed in each frame. The guard interval is a guard time interval for transition between downlink transmission and uplink transmission in a TDD mode, and is used to avoid interference between a downlink and an uplink.

Specifically, referring to FIG. 18 (a) and FIG. 18 (b), a shared symbol 1010 obtained by converting the first-type symbol 520 shown in FIG. 12 is used to send uplink or downlink data, and the second-type symbol 1020 may be used to send uplink/downlink control information or an uplink/downlink RS. In this embodiment of the present disclosure, an RS symbol may be used as a guard interval for uplink-to-downlink switching or used to transmit an uplink/downlink control signal. In addition, some data symbols sharing a CP or an independent RS symbol may be further used to transmit an uplink or downlink control signal.

In the foregoing embodiments, it can be considered that in the radio frame structures shown in FIG. 13 to FIG. 16, every four 60 KHz data symbols share one first CP. In actual application, a quantity of data symbols sharing a first CP may be adjusted based on a data transmission requirement. As shown in FIG. 17, every two 60 KHz data symbols may share one first CP. Alternatively, every five 75 KHz data symbols may share one first CP, or every six 90 KHz data symbols share one first CP.

Table 4 is a list of parameters in various radio frame structures in FIG. 13 to FIG. 18 by using an example in which a bandwidth is 20M and a sampling rate is 30.72 megabits per second (Mbps) (a sampling rate and a common bandwidth in existing LTE).

TABLE 4

| | Transmission bandwidth (megahertz) | Subframe spacing (millisecond) | Length of the shared symbol (microsecond/a quantity of time domain samples) | Length of the second-type symbol (microsecond/ a quantity of time domain samples) | CP length (microsecond/ a quantity of time domain samples) |
|---|---|---|---|---|---|
| FIG. 13 | 20 | 1 | 66.67/2048 | 16.67/512 | 3.39/104 for 16 CPs<br>3.13/96 for four CPs |
| FIG. 14 | 20 | 1 | 66.67/2048 | 16.67/512 | 3.39/104 for 16 CPs<br>3.13/96 for four CPs |
| FIG. 15 (a) to FIG. 15 (c), and FIG. 16 | 20 | 1 | 66.67/2048 | 16.67/512 | 5.47/168 for 12 CPs<br>5.73/176 for six CPs |
| FIG. 17 | 20 | 1 | 33.33/1024 | 16.67/512 | 2.08/64 |
| FIG. 18 | 20 | 1 | 66.67/2048 | 16.67/512 | 5.21/160 for four CPs<br>4.95/152 for 16 CPs |

The parameters of the embodiments in the foregoing table may be applied to a frequency band below 6 GHz (Sub 6G). To apply to a scenario of a high frequency (above 6G), a higher speed, a larger bandwidth, or serious phase noise, all subcarrier spacings may be proportionally increased. The following provides an example in which a subcarrier spacing amplification factor is n.

TABLE 5

| | Subframe spacing (millisecond) | Length of a first shared symbol (microsecond) | Length of the second-type symbol (microsecond) | CP length (microsecond) |
|---|---|---|---|---|
| FIG. 13 | 1/n | 66.67/n | 16.67/n | 3.39/n for 16 CPs<br>3.13/n for four CPs |
| FIG. 14 | 1/n | 66.67/n | 16.67/n | 3.39/n for 16 CPs<br>3.13/n for four CPs |
| FIG. 15 (a) to FIG. 15 (c), and FIG. 16 | 1/n | 66.67/n | 16.67/n | 5.47/n for 12 CPs<br>5.73/n for six CPs |
| FIG. 17 | 1/n | 33.33/n | 16.67/n | 2.08/n |
| FIG. 18 | 1/n | 66.67/n | 16.67/n | 5.21/n for four CPs<br>4.95/n for 16 CPs |

Figure 19:
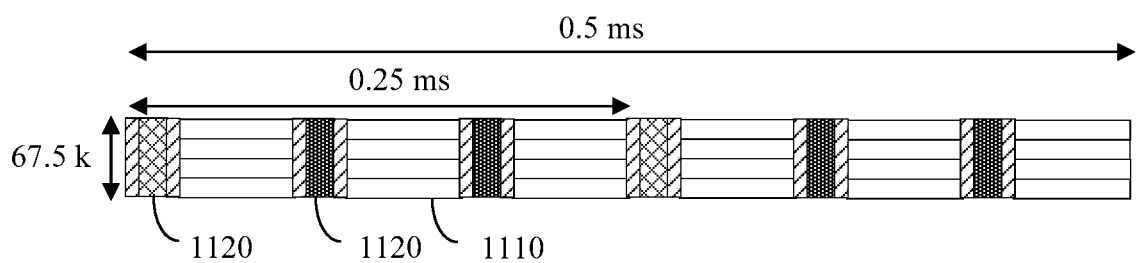
FIG. 19 is a schematic structural diagram of another radio frame used in a data processing method according to an embodiment of the present disclosure.

FIG. 19 is a schematic structural diagram of another radio frame used in a data processing method according to an embodiment of the present disclosure.

Referring to FIG. 19, to support high-reliability and low-delay communication, in addition to shortening a TTI length by increasing a subcarrier spacing, the TTI length may be shortened by reducing a quantity of TTI symbols. To implement better alignment or scaling, a quantity of TTIs (a dividable minimum TTI) within 1 ms is $2^n$ as much as possible. FIG. 10 is a schematic structural diagram of another radio frame used in a data processing method according to an embodiment of the present disclosure.

As shown in FIG. 19, the subcarrier spacing is 16.875 kilohertz, duration of the shared symbol 1110 is 59.26 microseconds, duration of the second-type symbol 1120 is 14.81 microseconds, and duration of the first CP 1130 and that of the second CP 1140 are 5 microseconds. In this embodiment, to reduce overheads, some second-type symbols 1120 may be used to send uplink or downlink data.

Figure 20:
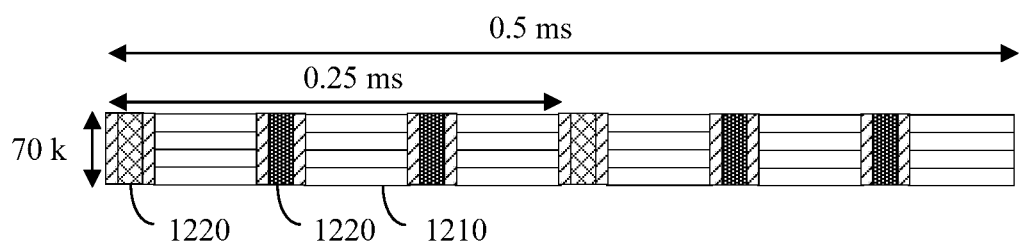
FIG. 20 is a schematic structural diagram of another radio frame used in a data processing method according to an embodiment of the present disclosure.

FIG. 20 is a schematic structural diagram of another radio frame used in a data processing method according to an embodiment of the present disclosure.

Referring to FIG. 20, in another embodiment, the subcarrier spacing is 17.5 kilohertz, duration of the shared symbol 1210 is 57.14 microseconds, duration of the second-type symbol 1220 is 14.29 microseconds, and duration of the first CP 1230 and that of the second CP 1240 are 5.95 microseconds.

Likewise, to apply to a scenario of a high frequency, a higher speed, a larger bandwidth, or serious phase noise, all subcarrier spacings in FIG. 19 and FIG. 20 may be increased by n times. Correspondingly, duration of all symbols and CPs is shortened by n times.

In the foregoing embodiments, lengths of CPs on symbols in a same frame format are as close or even as possible. In addition, a proportion of the lengths of the CPs added to the symbols may also be consistent with a proportion of lengths of the symbols. For example, if a proportion of the length of the shared symbol to that of the second-type symbol is 4:1, a proportion of a CP length of the shared symbol to that of the second-type symbol may also be configured as 4:1.

In addition, in future 5G to adapt to different service requirements, deployment scenarios, and the like, a plurality of system parameters (e.g. numerology) may coexist in a segment of a frequency spectrum.

Figure 21:
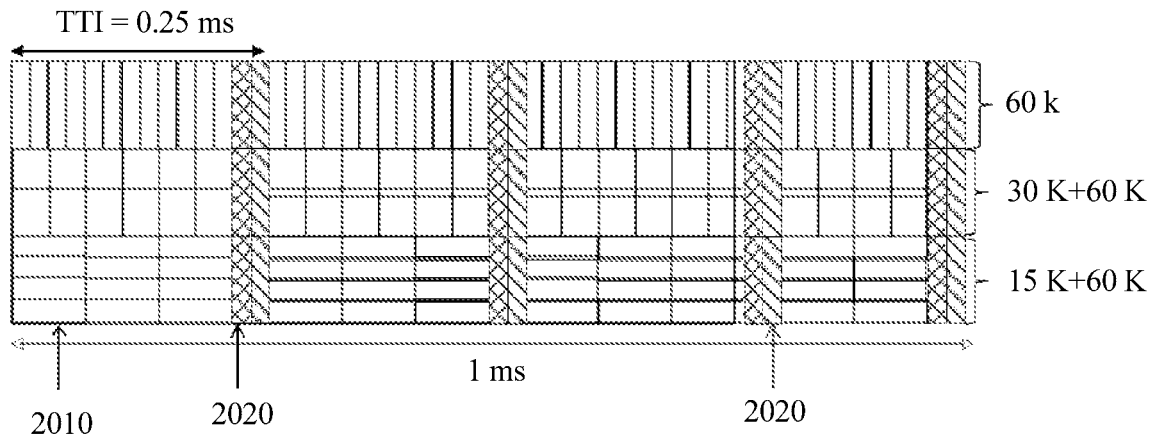
FIG. 21 (a) and FIG. 21 (b) are a schematic structural diagram of another radio frame used in a data processing method according to an embodiment of the present disclosure.
Figure 21:
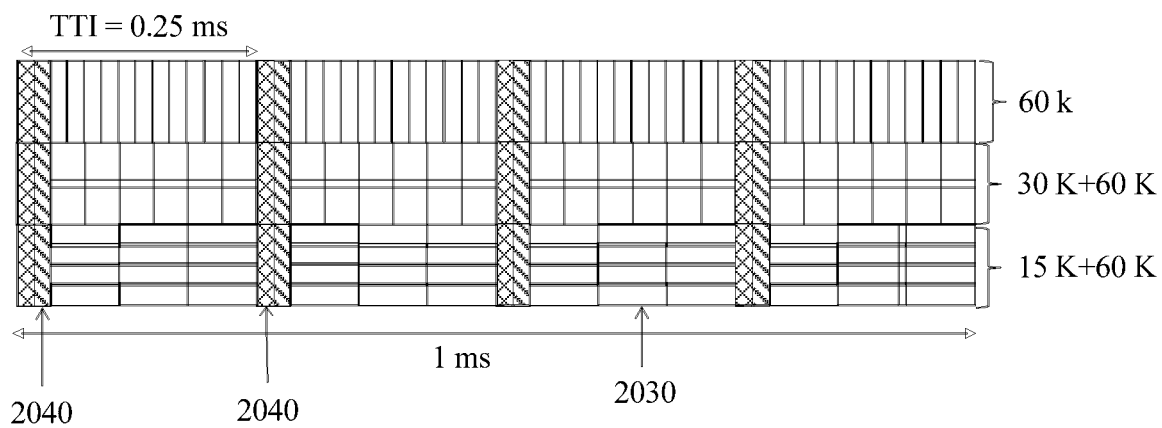

FIG. 21 (a) and FIG. 21 (b) are a schematic structural diagram of another radio frame used in a data processing method according to an embodiment of the present disclosure.

Referring to FIG. 21 (a) and FIG. 21 (b), in a scenario in which a plurality of system parameters numerology coexist, if an LTE baseline frame structure or an LTE baseline proportional-scaling frame format is used, to maintain a self-contained feature, some resources are wasted on a narrow subcarrier spacing symbol (such as a 15 KHz subcarrier spacing) to align guard intervals (a time length is at a symbol level) for uplink-downlink transition on a wide subcarrier spacing symbol (such as a 60 KHz subcarrier spacing) (to be specific, the 15K subcarrier spacing needs an entire 15K symbol to serve as a guard interval for transition, but only a guard interval of a 60K symbol length may be actually required for transition). The frame structures designed in the foregoing embodiments of the present disclosure may efficiently implement a self-contained design in which a plurality of numerologies coexist. As shown in FIG. 21 (*a*), in a downlink service, a shared symbol 2010 is used for downlink transmission (including control of data and a pilot), and a second-type symbol 2020 is used for uplink control and a guard interval for uplink-downlink transition. As shown in FIG. 21 (*b*), in an uplink service, a shared symbol 2030 is used for uplink control, and a second-type symbol 2040 is used for uplink transmission (including transmission of control information, data, and pilot information) and a guard interval for uplink-downlink transition.

It can be understood that quantities, lengths, and locations of the first-type symbol and the second-type symbol in the foregoing embodiments are merely an example for description, but do not constitute a limitation. Persons skilled in the art may set specific quantities of the first-type symbol and the second-type symbol based on a radio frame structure and an actual data transmission requirement.

Further, the data processing method in this embodiment of the present disclosure further includes the following steps.

S105. The receive end receives the data sent by the transmit end, where the data includes data obtained after the transmit end successively performs inverse fast Fourier transform IFFT processing on and adds a common cyclic prefix CP to the data that is transmitted on the shared symbol and that is obtained after the transmit end preprocesses the data transmitted on the at least two first-type symbols in the radio frame that are serial in time domain, and the data transmitted on the shared symbol includes the data transmitted on the at least two first-type symbols.

S106. The receive end removes the first CP added to the data transmitted on the shared symbol.

S107. The receive end performs fast Fourier transform (FFT) processing on the data that is transmitted on the shared symbol and from which the first CP is removed.

S108. The receive end performs inverse processing of the preprocessing on the data that is transmitted on the shared symbol and on which FFT processing is performed, to obtain the data transmitted on the at least two first-type symbols that are serial in time domain.

Specifically, the receive end performs, by using inverse Fourier transform, parallel-to-serial conversion, inverse overall Fourier transform, an inverse Hadamard matrix, or an inverse identity matrix, inverse processing of the preprocessing on data transmitted on at least two first-type symbols in the radio frame that are parallel.

Based on the foregoing embodiment, the radio frame further includes at least one second-type symbol, a time length of the second-type symbol is less than a time length of the shared symbol, and the data that is sent by the transmit end and that is received by the receive end further includes:

data that is obtained after the transmit end adds a second CP to data transmitted on each second-type symbol in the radio frame.

Based on the foregoing embodiment, the data that is transmitted on the shared symbol and that is obtained after the transmit end preprocesses the data transmitted on the at least two first-type symbols in the radio frame that are serial in time domain includes data that is transmitted on a first shared symbol obtained after the first-type sub-symbol is preprocessed, and data that is transmitted on a second shared symbol obtained after the second-type sub-symbol is preprocessed.

A first CP 1 is added to the data transmitted on the first shared symbol, and a first CP 2 is added to the data transmitted on the second shared symbol.

That the receive end removes the first CP added to the data transmitted on the shared symbol includes:

removing, by the receive end, the first CP 1 of the data transmitted on the first shared symbol and the first CP 2 of the data transmitted on the second shared symbol.

That the receive end performs fast Fourier transform FFT processing on the data that is transmitted on the shared symbol and from which the first CP is removed includes:

performing, by the receive end, FFT processing on the first shared symbol from which the first CP 1 is removed and the second shared symbol from which the first CP 2 is removed.

That the receive end performs inverse processing of the preprocessing on the data that is transmitted on the shared symbol and on which FFT processing is performed, to obtain the data transmitted on the at least two first-type symbols that are serial in time domain includes:

performing, by the receive end, processing of the precoding on the first shared symbol on which FFT processing is performed, to obtain data transmitted on the at least two first-type sub-symbols; and performing, by the receive end, processing of the precoding on the second shared symbol on which FFT processing is performed, to obtain data transmitted on the at least two second-type sub-symbols.

It can be understood that the receive end performs an operation on the received data that is opposite to an operation performed by the transmit end on the data, to separate the data transmitted on the first-type symbol, and then uses a same processing procedure as an existing receive end to restore the data sent by the transmit end.

According to the data processing method provided in this embodiment of the present disclosure, the transmit end preprocesses the data transmitted on the at least two first-type symbols in the radio frame that are parallel, converts the data transmitted on the at least two parallel first-type symbols into the data transmitted on the shared symbol, and adds the first CP to the data transmitted on the shared symbol, so that a quantity of added CPs in the radio frame can be reduced. When a time length of a symbol is shortened because of an increase in a subcarrier spacing, compared with a prior-art solution of proportionally shortening a length of a CP on each symbol, in this embodiment of the present disclosure, a quantity of CPs is reduced, so that it can be ensured that total duration of the CPs remains unchanged, that is, CP overheads remain unchanged. In addition, duration of each CP is greater than duration of a CP obtained after the proportional shortening in the conventional technology, and therefore relatively large channel delay spread may be resisted, and a signal transmission coverage area may be increased.

An embodiment of the present disclosure further provides a data processing method, and the method includes:

sending, by a transmit end, information to a receive end by using a hybrid frame structure, where the information includes at least one of service data, control information, and a reference signal, the hybrid frame structure includes a shared symbol and a second-type symbol, a first CP is added to the shared symbol, a second CP is added to the second-type symbol, and a length of the shared symbol is greater than a length of the second-type symbol.

Specifically, a difference between a length of the first CP and a length of the second CP is less than a preset threshold, so that the length of the CP added to the shared symbol and that of the CP added to the second-type symbol are as close as possible, thereby ensuring that capabilities of symbols in the radio frame to resist ISI are similar or the same.

Alternatively, if a proportion of the length of the shared symbol to that of the second-type symbol is n:1, a proportion of a length of the first CP to a length of the second CP is also n:1, and n is greater than 1. To be specific, a proportion of lengths of CPs added to symbols may also be consistent with a proportion of lengths of the symbols, so that the symbols are better aligned when a plurality of numerologies coexist, namely, an example in FIG. 20.

An embodiment of the present disclosure further provides a data processing method, and the method includes:

receiving, by a receive end by using a hybrid frame structure, information sent by a transmit end, where the information includes at least one of service data, control information, and a reference signal, the hybrid frame structure includes a shared symbol and a second-type symbol, a first CP is added to the shared symbol, a second CP is added to the second-type symbol, and a length of the shared symbol is greater than a length of the second-type symbol.

Technical effects of the data processing method provided in this embodiment of the present disclosure are similar to those of the data processing method provided in the foregoing method embodiments, and are not described herein again.

Figure 22:
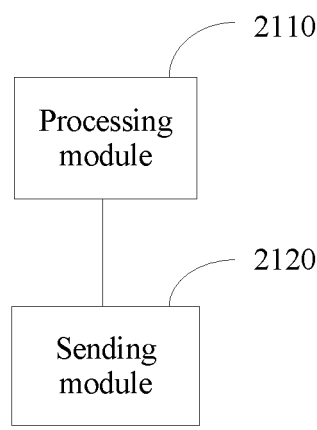
FIG. 22 is a schematic structural diagram of a data processing apparatus according to an embodiment of the present disclosure.

FIG. 22 is a schematic structural diagram of a data processing apparatus according to an embodiment of the present disclosure.

Referring to FIG. 22, this embodiment of the present disclosure further provides the data processing apparatus, and the apparatus includes a processing module 2110 and a sending module 2120.

The processing module 2110 is configured to: preprocess data transmitted on at least two first-type symbols in a radio frame that are serial in time domain, and convert the data transmitted on the at least two first-type symbols into data transmitted on a shared symbol. The data transmitted on the shared symbol includes the data transmitted on the at least two first-type symbols.

The processing module 2110 is further configured to perform inverse fast Fourier transform IFFT processing on the data transmitted on the shared symbol.

The processing module 2110 is further configured to add a first CP to the data that is transmitted on the shared symbol and on which IFFT processing is performed.

The sending module 2120 is configured to send, to a receive end, the data that is transmitted on the shared symbol and to which the first CP is added.

Based on the foregoing embodiment, the radio frame further includes at least one second-type symbol, a time length of the second-type symbol is less than a time length of the shared symbol, and the processor 2110 is further configured to:

add a second CP to data transmitted on the second-type symbol; and send, to the receive end, the data that is transmitted on the at least one second-type symbol and to which the second CP is added and the data that is transmitted on the shared symbol and to which the first CP is added.

Based on the foregoing embodiment, the processor 2110 is configured to:

preprocess, by using interleaving Fourier transform, serial-to-parallel conversion, overall Fourier transform, a Hadamard matrix, or an identity matrix, data transmitted on at least two first-type symbols in the radio frame that are parallel.

Based on the foregoing embodiment, the first-type symbol is used to transmit uplink data or downlink data, and the second-type symbol is used to transmit a reference signal or used to control information about uplink data transmission or downlink data transmission, or is used as a guard interval for uplink-downlink transition in a time division duplex TDD mode.

Based on the foregoing embodiment, the data transmitted on the first-type symbol is uplink data, and the processing module 2110 is further configured to:

perform discrete Fourier transform on at least two pieces of input data, to obtain the data transmitted on the first-type symbol.

Based on the foregoing embodiment, the data transmitted on the first-type symbol is downlink data, and the processing module 2110 is further configured to:

perform serial-to-parallel conversion on the at least two pieces of input data, to obtain the data transmitted on the first-type symbol.

Specifically, the data processing apparatus provided in this embodiment of the present disclosure is configured to perform the data processing method provided in the foregoing method embodiments. Specific implementations and achieved technical effects are similar to those of the method embodiments, and are not described herein again.

Figure 23:
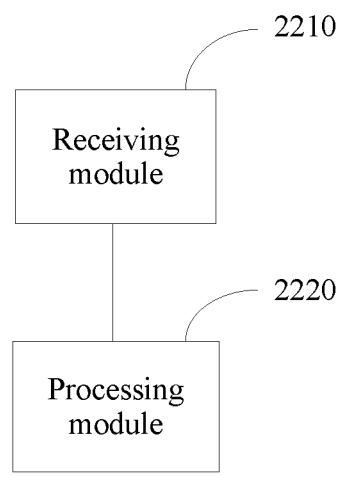
FIG. 23 is a schematic structural diagram of a data processing apparatus according to another embodiment of the present disclosure.

FIG. 23 is a schematic structural diagram of a data processing apparatus according to another embodiment of the present disclosure.

Referring to FIG. 23, the another embodiment of the present disclosure further provides the data processing apparatus, and the apparatus includes a receiving module 2210 and a processing module 2220.

The receiving module 2210 is configured to receive data sent by a transmit end. The data includes data obtained after the transmit end performs inverse fast Fourier transform IFFT processing on and adds a first CP to data that is transmitted on a shared symbol and that is obtained after the transmit end preprocesses data transmitted on at least two first-type symbols in a radio frame that are serial in time domain. The data transmitted on the shared symbol includes the data transmitted on the at least two first-type symbols.

The processing module 2220 is configured to remove the first CP added to the data transmitted on the shared symbol.

The processing module 2220 is further configured to perform fast Fourier transform FFT processing on the data that is transmitted on the shared symbol and from which the first CP is removed.

The processing module 2220 is further configured to perform inverse processing of the preprocessing on the data that is transmitted on the shared symbol and on which FFT processing is performed, to obtain the data transmitted on the at least two first-type symbols that are serial in time domain.

Based on the foregoing embodiment, the radio frame further includes at least one second-type symbol, a time length of the second-type symbol is less than a time length of the shared symbol, and the processing module 2220 is further configured to:

data that is obtained after a second CP is added to data transmitted on each of the at least one second-type symbol in the radio frame.

Based on the foregoing embodiment, the processing module 2220 is configured to:

perform, by using inverse Fourier transform, parallel-to-serial conversion, inverse overall Fourier transform, an inverse Hadamard matrix, or an inverse identity matrix, inverse processing of the preprocessing on data transmitted on at least two first-type symbols in the radio frame that are parallel.

Based on the foregoing embodiment, the first-type symbol is used to transmit uplink or downlink data, and the second-type symbol is used to transmit a reference signal or used to control information about uplink data transmission or downlink data transmission, or is used as an uplink-to-downlink switching point in a time division duplex TDD mode.

Based on the foregoing embodiment, the data transmitted on the first-type symbol is uplink data, and the processing module 2220 is further configured to:

perform inverse discrete Fourier transform on the data transmitted on the first-type symbol, to obtain at least two pieces of output data.

Based on the foregoing embodiment, the data transmitted on the first-type symbol is downlink data, and the processing module 2220 is further configured to:

perform parallel-to-serial conversion on the data transmitted on the first-type symbol, to obtain at least two pieces of output data.

Specifically, the data processing apparatus provided in this embodiment of the present disclosure is configured to perform the data processing method provided in the foregoing method embodiments. Specific implementations and achieved technical effects are similar to those of the method embodiments, and are not described herein again.

Figure 24:
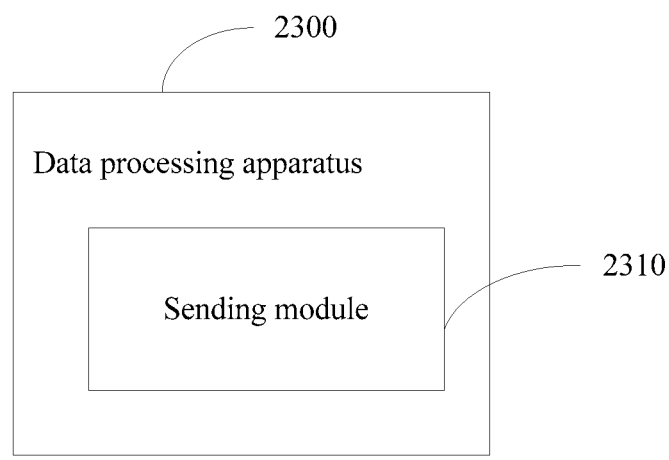
FIG. 24 is a schematic structural diagram of a data processing apparatus according to another embodiment of the present disclosure.

FIG. 24 is a schematic structural diagram of a data processing apparatus according to another embodiment of the present disclosure.

Referring to FIG. 24, the another embodiment of the present disclosure further provides a data processing apparatus 2300, including a sending module 2310. The sending module 2310 is configured to send information to a receive end by using a hybrid frame structure. The information includes at least one of service data, control information, and a reference signal, the hybrid frame structure includes a shared symbol and a second-type symbol, a first cyclic prefix CP is added to the shared symbol, a second CP is added to the second-type symbol, and a length of the shared symbol is greater than a length of the second-type symbol.

Based on the foregoing embodiment, a difference between a length of the first CP and a length of the second CP is less than a preset threshold.

Based on the foregoing embodiment, a proportion of the length of the shared symbol to that of the second-type symbol is n:1, a proportion of a length of the first CP to a length of the second CP is also n:1, and n is greater than 1.

The data processing apparatus provided in this embodiment of the present disclosure sends the information to the receive end by using the sending module by using the hybrid frame structure, and the hybrid frame structure includes the shared symbol and the second-type symbol. The first cyclic prefix CP is added to the shared symbol, the second CP is added to the second-type symbol, and the length of the shared symbol is greater than the length of the second-type symbol. The hybrid frame structure used by the data processing apparatus provided in the present disclosure may reduce a quantity of added CPs in the radio frame. When a time length of a symbol is shortened because of an increase in a subcarrier spacing, a quantity of CPs is reduced in this embodiment of the present disclosure, so that it can be ensured that total duration of the CPs remains unchanged, that is, CP overheads remain unchanged. In addition, duration of each CP is greater than duration of a CP obtained after the proportional shortening in the conventional technology, and therefore relatively large channel delay spread may be resisted, and a signal transmission coverage area may be increased.

Figure 25:
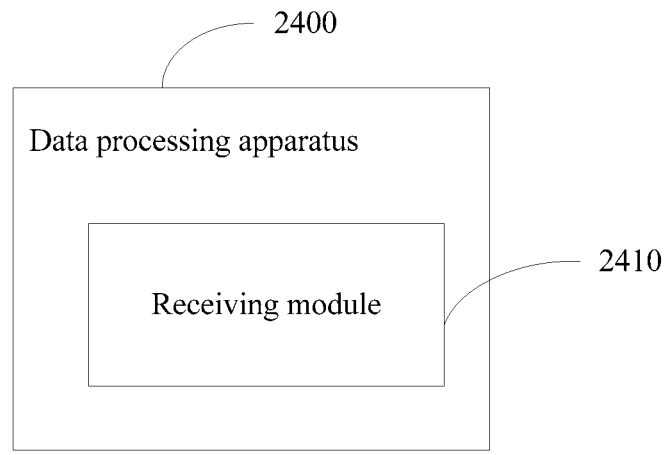
FIG. 25 is a schematic structural diagram of a data processing apparatus according to another embodiment of the present disclosure.

FIG. 25 is a schematic structural diagram of a data processing apparatus according to another embodiment of the present disclosure.

Referring to FIG. 25, the another embodiment of the present disclosure further provides a data processing apparatus 2400, including a receiving module 2410. The receiving module 2410 is configured to receive, by using a hybrid frame structure, information sent by a transmit end. The information includes at least one of service data, control information, and a reference signal, the hybrid frame structure includes a shared symbol and a second-type symbol, a first CP is added to the shared symbol, a second CP is added to the second-type symbol, and a length of the shared symbol is greater than a length of the second-type symbol.

Based on the foregoing embodiment, a difference between a length of the first CP and a length of the second CP is less than a preset threshold.

Based on the foregoing embodiment, a proportion of the length of the shared symbol to that of the second-type symbol is n:1, a proportion of a length of the first CP to a length of the second CP is also n:1, and n is greater than 1.

The receiving module receives, by using the hybrid frame structure, the information sent by the transmit end, and the hybrid frame structure includes the shared symbol and the second-type symbol. The first CP is added to the shared symbol, the second CP is added to the second-type symbol, and the length of the shared symbol is greater than the length of the second-type symbol. The hybrid frame structure used by the data processing apparatus provided in this embodiment of the present disclosure may reduce a quantity of added CPs in the radio frame. When a time length of a symbol is shortened because of an increase in a subcarrier spacing, a quantity of CPs is reduced in this embodiment of the present disclosure, so that it can be ensured that total duration of the CPs remains unchanged, that is, CP overheads remain unchanged. In addition, duration of each CP is greater than duration of a CP obtained after the proportional shortening in the conventional technology, and therefore relatively large channel delay spread may be resisted, and a signal transmission coverage area may be increased.

Figure 26:
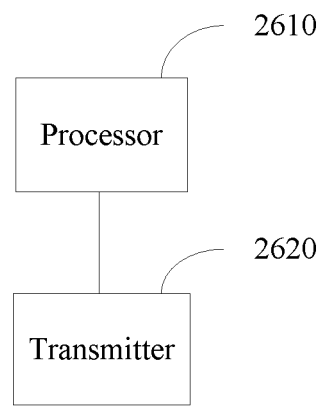
FIG. 26 is a schematic structural diagram of a data processing apparatus according to another embodiment of the present disclosure.

FIG. 26 is a schematic structural diagram of a data processing apparatus according to an embodiment of the present disclosure.

Referring to FIG. 26, this embodiment of the present disclosure further provides the data processing apparatus, and the apparatus includes a processor 2610 and a transmitter 2620.

The processor 2610 is configured to: preprocess data transmitted on at least two first-type symbols in a radio frame that are serial in time domain, and convert the data transmitted on the at least two first-type symbols into data transmitted on a shared symbol. The data transmitted on the shared symbol includes the data transmitted on the at least two first-type symbols.

The processor 2610 is further configured to perform inverse fast Fourier transform IFFT processing on the data transmitted on the shared symbol.

The processor 2610 is further configured to add a first CP to the data that is transmitted on the shared symbol and on which IFFT processing is performed.

The transmitter 2620 is configured to send, to a receive end, the data that is transmitted on the shared symbol and to which the first CP is added.

Specifically, the data processing apparatus provided in this embodiment of the present disclosure is configured to perform the data processing method provided in the foregoing method embodiments. Specific implementations and achieved technical effects are similar to those of the method embodiments, and are not described herein again.

Figure 27:
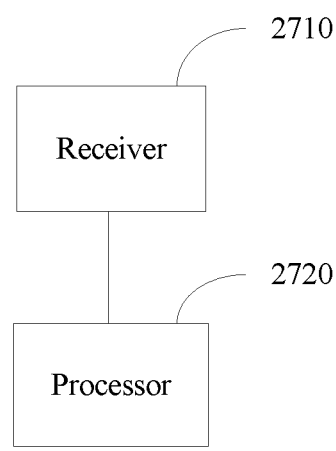
FIG. 27 is a schematic structural diagram of a data processing apparatus according to another embodiment of the present disclosure.

FIG. 27 is a schematic structural diagram of a data processing apparatus according to another embodiment of the present disclosure.

Referring to FIG. 27, the another embodiment of the present disclosure further provides the data processing apparatus, and the apparatus includes a receiver 2710 and a processor 2720.

The receiver 2710 is configured to receive data sent by a transmit end. The data includes data obtained after the transmit end performs inverse fast Fourier transform IFFT processing on and adds a first CP to data that is transmitted on a shared symbol and that is obtained after the transmit end preprocesses data transmitted on at least two first-type symbols in a radio frame that are serial in time domain, and the data transmitted on the shared symbol includes the data transmitted on the at least two first-type symbols.

The processor 2720 is configured to remove the first CP added to the data transmitted on the shared symbol.

The processor 2720 is further configured to perform fast Fourier transform FFT processing on the data that is transmitted on the shared symbol and from which the first CP is removed.

The processor 2720 is further configured to perform inverse processing of the preprocessing on the data that is transmitted on the shared symbol and on which FFT processing is performed, to obtain the data transmitted on the at least two first-type symbols that are serial in time domain. Specifically, the data processing apparatus provided in this embodiment of the present disclosure is configured to perform the data processing method provided in the foregoing method embodiments. Specific implementations and achieved technical effects are similar to those of the method embodiments, and are not described herein again.

Persons of ordinary skill in the art may understand that all or some of the steps of the method embodiments may be implemented by a program instructing relevant hardware. The program may be stored in a readable storage medium of a computer, a mobile phone, or another portable apparatus. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A data processing method, comprising:

preprocessing, by a transmit end, data transmitted on at least two first-type symbols in a radio frame that are serial in time domain, and converting the data transmitted on the at least two first-type symbols into data transmitted on a shared symbol, wherein the data transmitted on the shared symbol comprises the data transmitted on the at least two first-type symbols, wherein the shared symbol has a smaller subcarrier spacing than the subcarrier spacing of the two first-type symbols;

performing, by the transmit end, inverse fast Fourier transform (IFFT) processing on the data transmitted on the shared symbol;

adding, by the transmit end, a first cyclic prefix (CP) to the data that is transmitted on the shared symbol and on which IFFT processing is performed; and sending, by the transmit end to a receive end, the data that is transmitted on the shared symbol and to which the first CP is added.

2. The method according to claim 1, wherein the radio frame further comprises at least one second-type symbol, and a time length of the second-type symbol is less than a time length of the shared symbol; and the method further comprises:

adding, by the transmit end, a second CP to data transmitted on the second-type symbol; and the sending, by the transmit end to a receive end, the data that is transmitted on the shared symbol and to which the first CP is added comprises:

sending, by the transmit end to the receive end, the data that is transmitted on the at least one second-type symbol and to which the second CP is added and the data that is transmitted on the shared symbol and to which the first CP is added.

3. The method according to claim 1, wherein the preprocessing, by a transmit end, data transmitted on first-type symbols in a radio frame that are serial in time domain comprises:

preprocessing, by the transmit end by using interleaving Fourier transform, serial-to-parallel conversion, overall Fourier transform, a Hadamard matrix, or an identity matrix, data transmitted on at least two first-type symbols in the radio frame that are serial.

4. The method according to claim 1, wherein the first-type symbol is used to transmit uplink data or downlink data, and the second-type symbol is used to transmit a reference signal or used to control information about uplink data transmission or downlink data transmission, or is used as a guard interval for uplink-downlink transition in a time division duplex (TDD) mode.

5. The method according to claim 1, wherein the data transmitted on the first-type symbol is uplink data, and before preprocessing, by a transmit end, the data transmitted on at least two first-type symbols in the radio frame that are serial in time domain, the method further comprises:

performing, by the transmit end, discrete Fourier transform on at least two pieces of input data, to obtain the data transmitted on the first-type symbol.

6. The method according to claim 1, wherein the data transmitted on the first-type symbol is downlink data, and before preprocessing, by a transmit end, the data transmitted on at least two first-type symbols in a radio frame that are serial in time domain, the method further comprises:

performing, by the transmit end, serial-to-parallel conversion on at least two pieces of input data, to obtain the data transmitted on the first-type symbol.

7. A data processing method, comprising:

receiving, by a receive end, data sent by a transmit end, wherein the data comprises data obtained after the transmit end performs inverse fast Fourier transform (IFFT) processing on and adds a first cyclic prefix (CP) to data that is transmitted on a shared symbol and that is obtained after the transmit end preprocesses data transmitted on at least two first-type symbols in a radio frame that are serial in time domain, and the data transmitted on the shared symbol comprises the data transmitted on the at least two first-type symbols, and wherein the shared symbol has a smaller subcarrier spacing than the subcarrier spacing of the two first-type symbols;

removing, by the receive end, the first CP added to the data transmitted on the shared symbol;

performing, by the receive end, fast Fourier transform (FFT) processing on the data that is transmitted on the shared symbol and from which the first CP is removed; and performing, by the receive end, inverse processing of the preprocessing on the data that is transmitted on the shared symbol and on which FFT processing is performed, to obtain the data transmitted on the at least two first-type symbols that are serial in time domain.

8. The method according to claim 7, wherein the radio frame further comprises at least one second-type symbol, a time length of the second-type symbol is less than a time length of the shared symbol, and the data that is sent by the transmit end and that is received by the receive end further comprises:

data that is obtained after the transmit end adds a second CP to time-domain data transmitted on each of the at least one second-type symbol in the radio frame.

9. The method according to claim 7, wherein performing, by the receive end, the inverse processing of the preprocessing on the data from which the first CP is removed comprises:

performing, by the receive end by using inverse Fourier transform, parallel-to-serial conversion, inverse overall Fourier transform, an inverse Hadamard matrix, or an inverse identity matrix, inverse processing of the preprocessing on data transmitted on at least two first-type symbols in the radio frame that are serial.

10. The method according to claim 7, wherein the first-type symbol is used to transmit uplink or downlink data, and the second-type symbol is used to transmit a reference signal or used to control information about uplink data transmission or downlink data transmission, or is used as an uplink-to-downlink switching point in a time division duplex (TDD) mode.

11. The method according to claim 7, wherein the data transmitted on the first-type symbol is uplink data, and after performing, by the receive end, the inverse processing of the preprocessing on the data that is transmitted on the shared symbol and on which FFT processing is performed, to obtain the data transmitted on the at least two first-type symbols that are serial in time domain, the method further comprises:

performing, by the receive end, inverse discrete Fourier transform on the data transmitted on the first-type symbol, to obtain at least two pieces of output data.

12. The method according to claim 7, wherein the data transmitted on the first-type symbol is downlink data, and after the performing, by the receive end, inverse processing of the preprocessing on the data that is transmitted on the shared symbol and on which FFT processing is performed, to obtain the data transmitted on the at least two first-type symbols that are serial in time domain, the method further comprises:

performing, by the receive end, parallel-to-serial conversion on the data transmitted on the first-type symbol, to obtain at least two pieces of output data.

13. A data processing apparatus, comprising: a processor and a transmitter coupled with the processor wherein the processor is configured to:

preprocess data transmitted on at least two first-type symbols in a radio frame that are serial in time domain, and convert the data transmitted on the at least two first-type symbols into data transmitted on a shared symbol, wherein the data transmitted on the shared symbol comprises the data transmitted on the at least two first-type symbols, and wherein the shared symbol has a smaller subcarrier spacing than the subcarrier spacing of the two first-type symbols;

wherein the processor is further configured to perform inverse fast Fourier transform (IFFT) processing on the data transmitted on the shared symbol; and wherein the processor is further configured to add a first cyclic prefix (CP) to the data that is transmitted on the shared symbol and on which IFFT processing is performed; and a transmitter is configured to send, to a receive end, the data that is transmitted on the shared symbol and to which the first CP is added.

14. The apparatus according to claim 13, wherein the radio frame further comprises at least one second-type symbol, and a time length of the second-type symbol is less than a time length of the shared symbol;

wherein the processor is further configured to add a second CP to data transmitted on the second-type symbol; and the transmitter is configured to send to the receive end, the data that is transmitted on the at least one second-type symbol and to which the second CP is added and the data that is transmitted on the shared symbol and to which the first CP is added.

15. The apparatus according to claim 13, wherein the processor is configured to:

preprocess, by using interleaving Fourier transform, serial-to-parallel conversion, overall Fourier transform, a Hadamard matrix, or an identity matrix, data transmitted on at least two first-type symbols in the radio frame that are serial.

16. The apparatus according to claim 13, wherein the first-type symbol is used to transmit uplink data or downlink data, and the second-type symbol is used to transmit a reference signal or used to control information about uplink data transmission or downlink data transmission, or is used as a guard interval for uplink-downlink transition in a time division duplex TDD mode.

17. The apparatus according to claim 13, wherein the data transmitted on the first-type symbol is uplink data, and the processing module is further configured to:
- perform discrete Fourier transform on at least two pieces of input data, to obtain the data transmitted on the first-type symbol.

18. The apparatus according to claim 13, wherein the data transmitted on the first-type symbol is downlink data, and the processing module is further configured to:
- perform serial-to-parallel conversion on the at least two pieces of input data, to obtain the data transmitted on the first-type symbol.

* * * * *